Feb. 25, 1964  H. F. JURGELEIT  3,121,918
MOLDING APPARATUS
Filed April 7, 1960  11 Sheets-Sheet 5
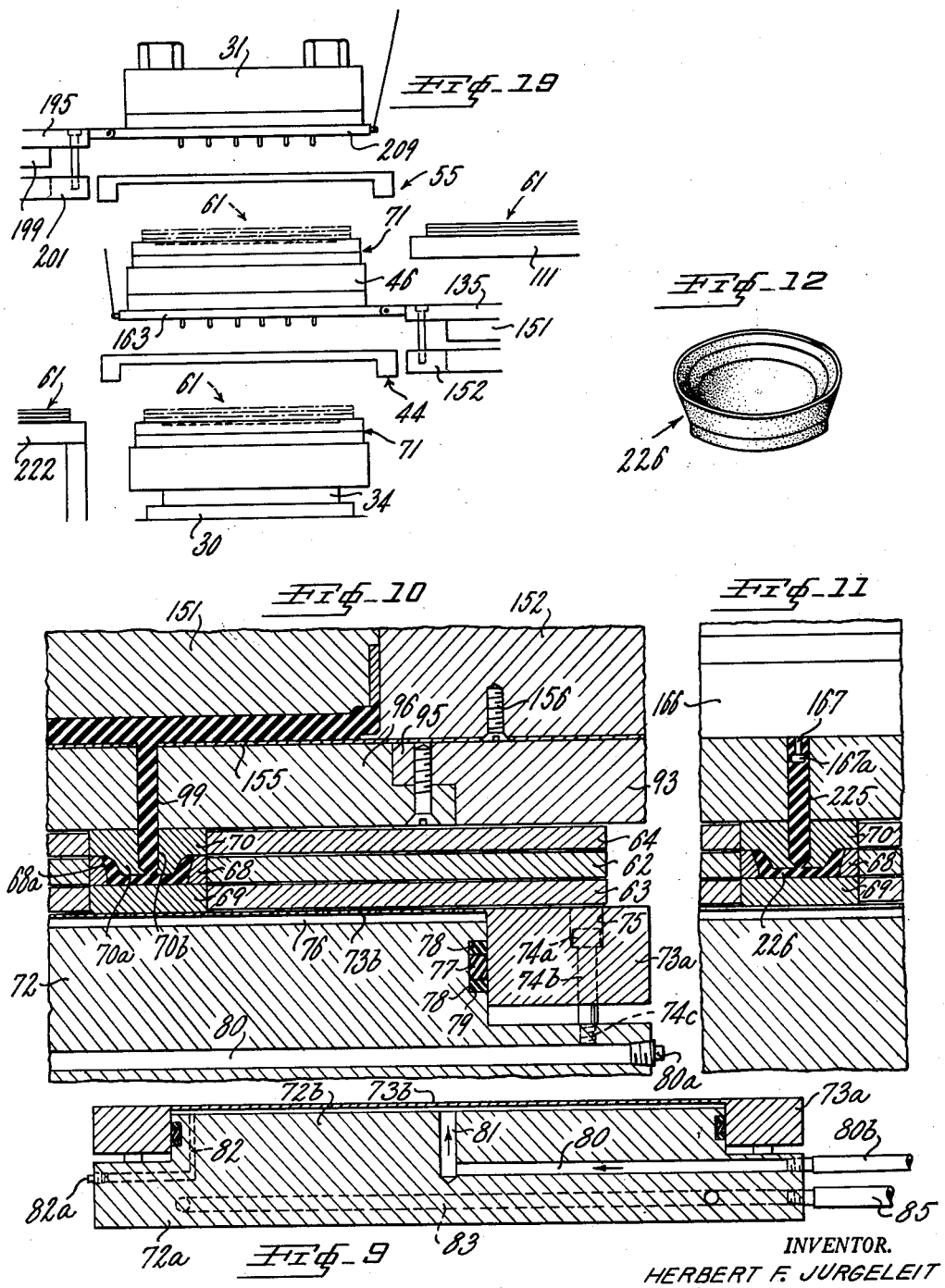
INVENTOR.
HERBERT F. JURGELEIT
BY Paul H Blaustein
ATTORNEY Feb. 25, 1964
H. F. JURGELEIT
3,121,918
MOLDING APPARATUS
Filed April 7, 1960
11 Sheets-Sheet 6
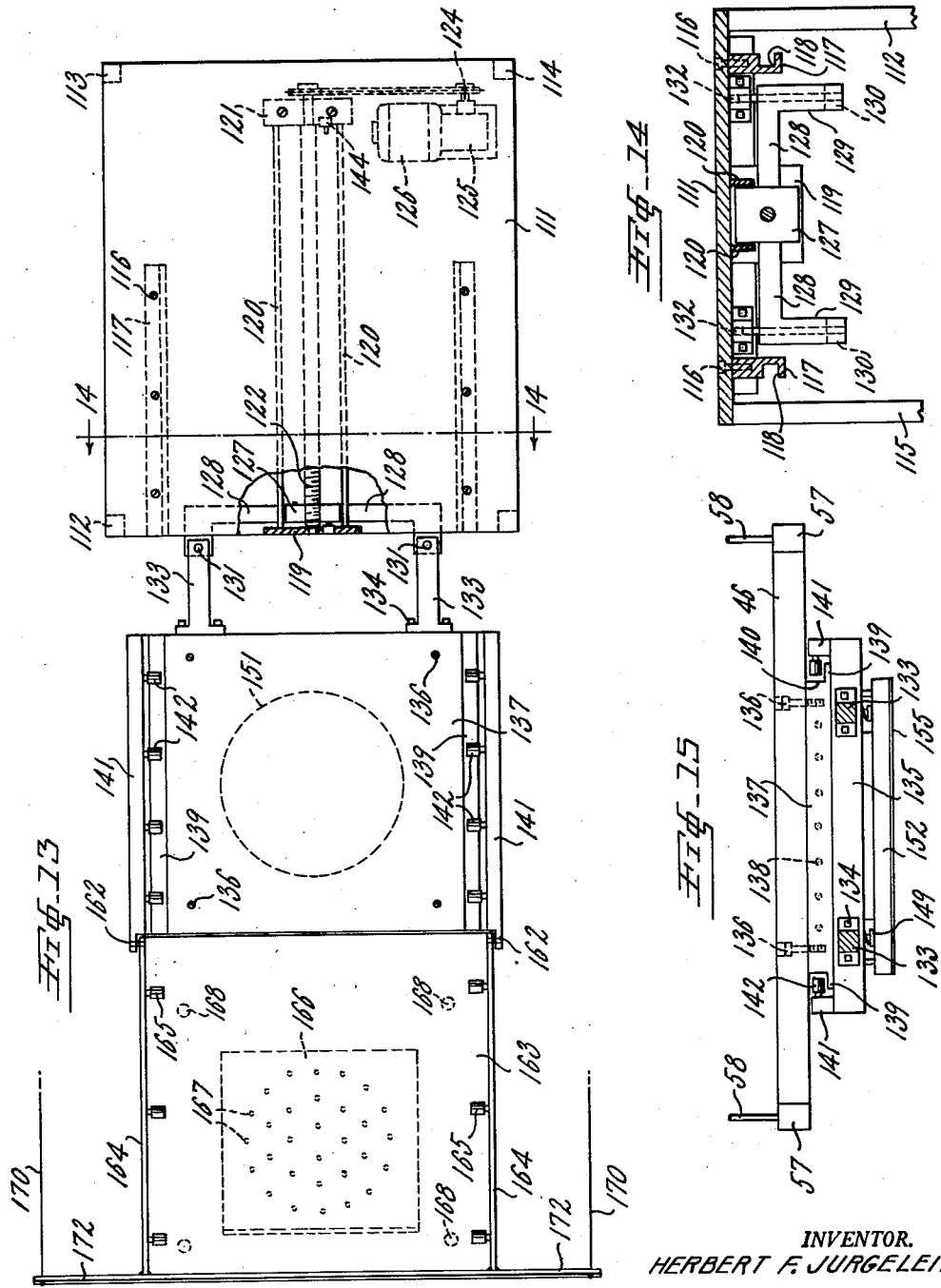
INVENTOR.
HERBERT F. JURGELEIT
BY *Paul H Blaustein*
ATTORNEY Feb. 25, 1964   H. F. JURGELEIT   3,121,918
MOLDING APPARATUS
Filed April 7, 1960   11 Sheets-Sheet 7
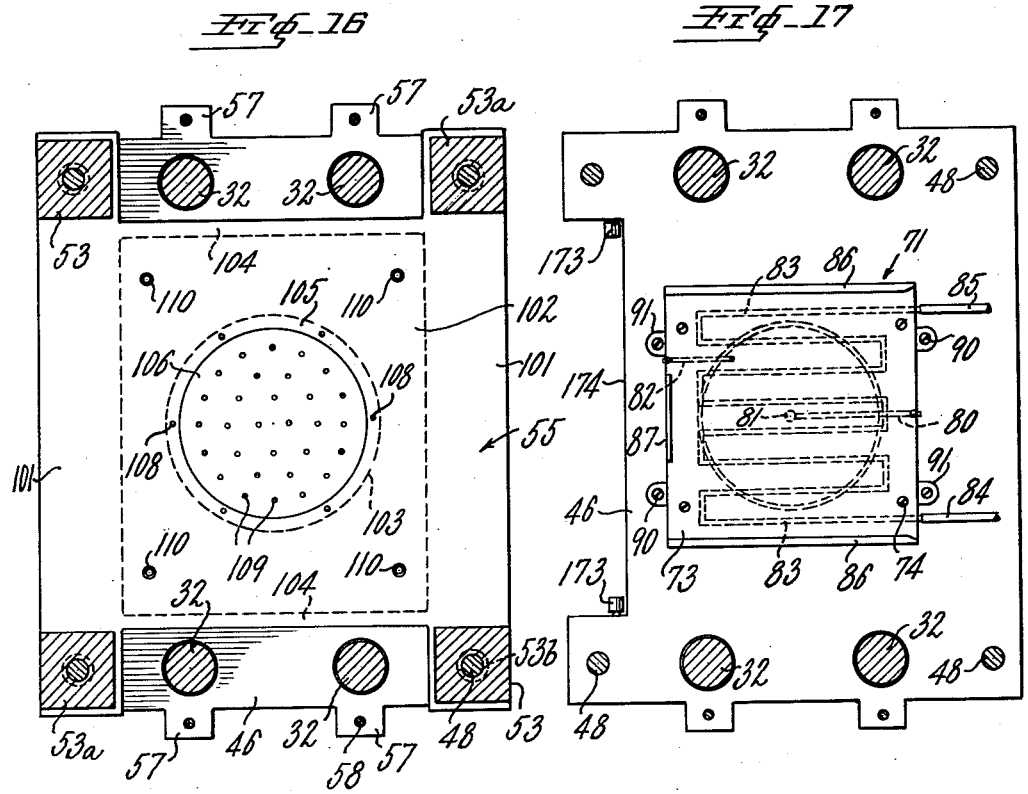
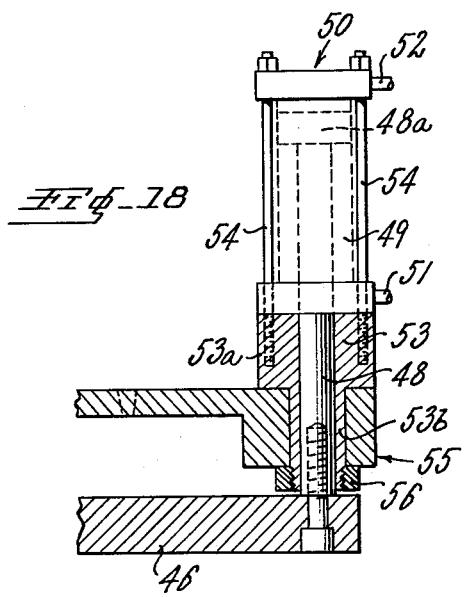
INVENTOR.
HERBERT F. JURGELEIT
BY Paul S Blaustein
ATTORNEY

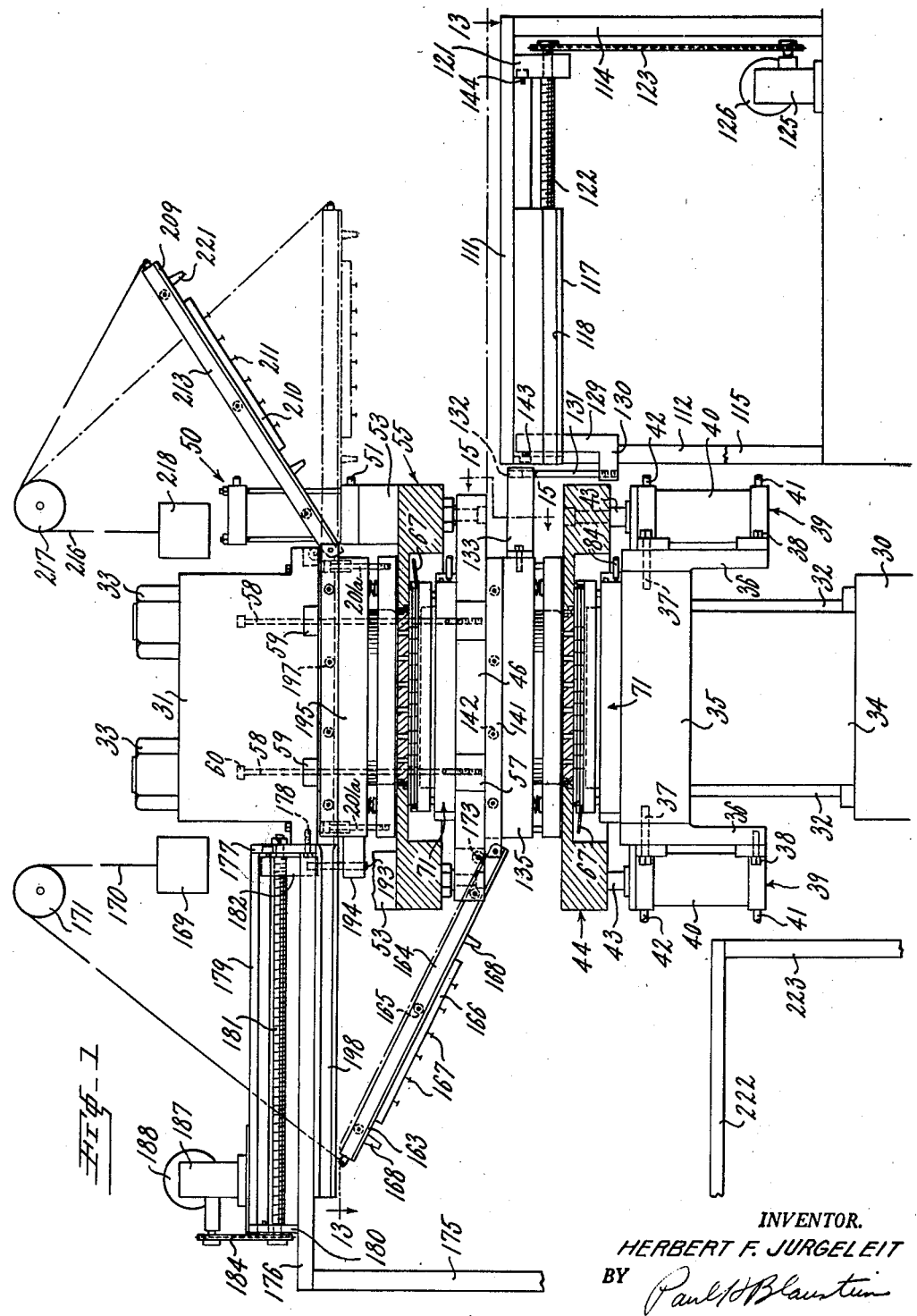

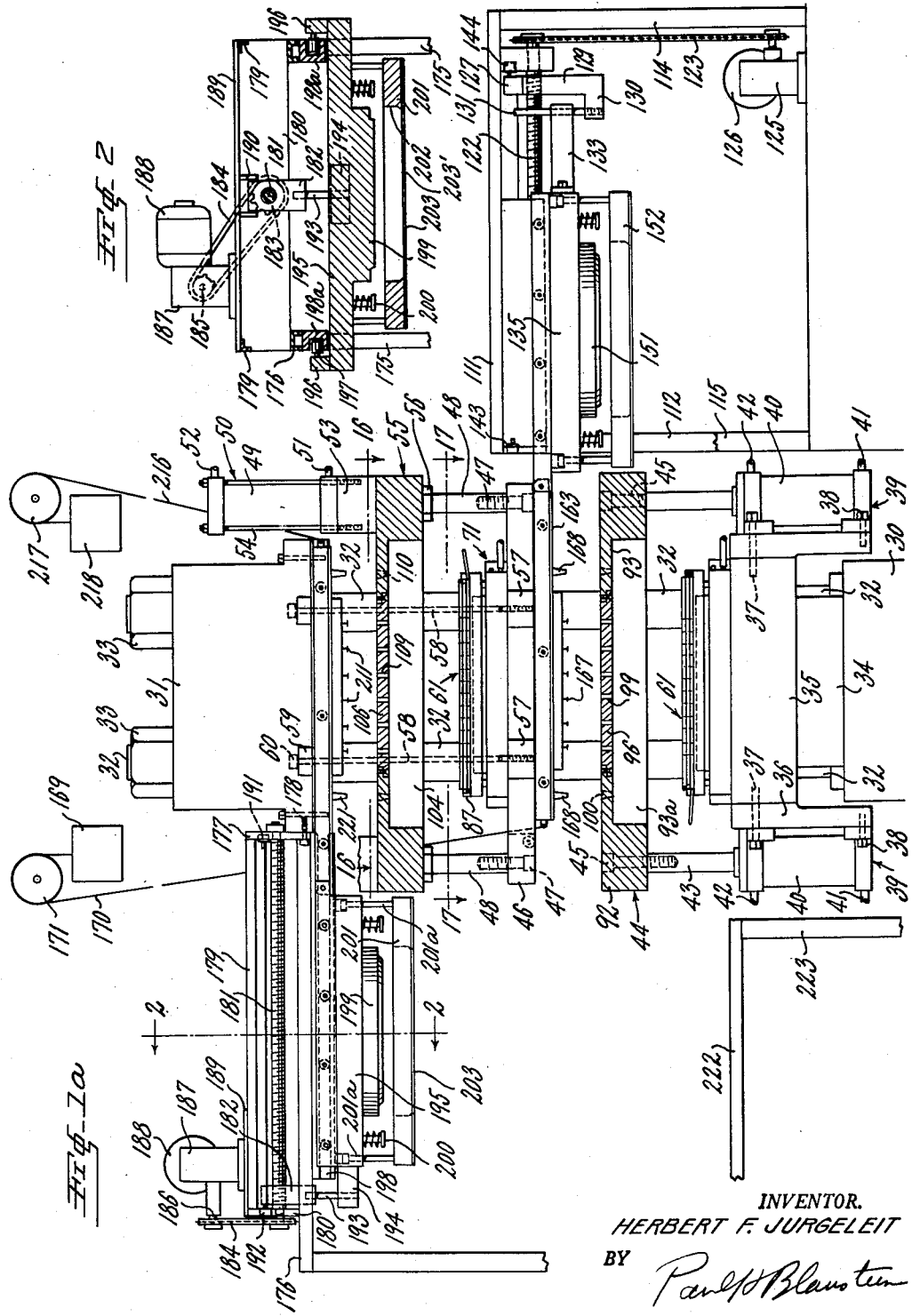

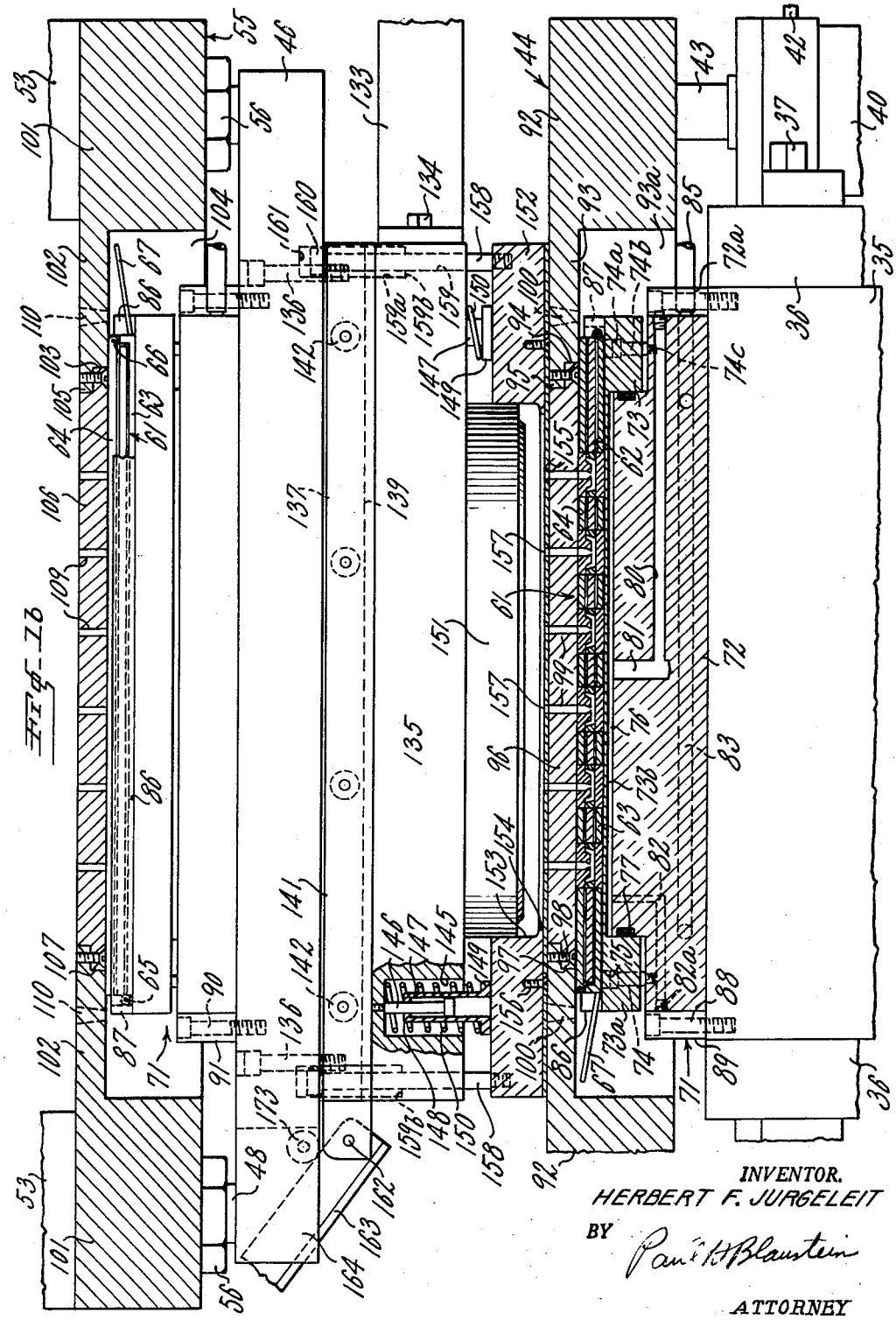

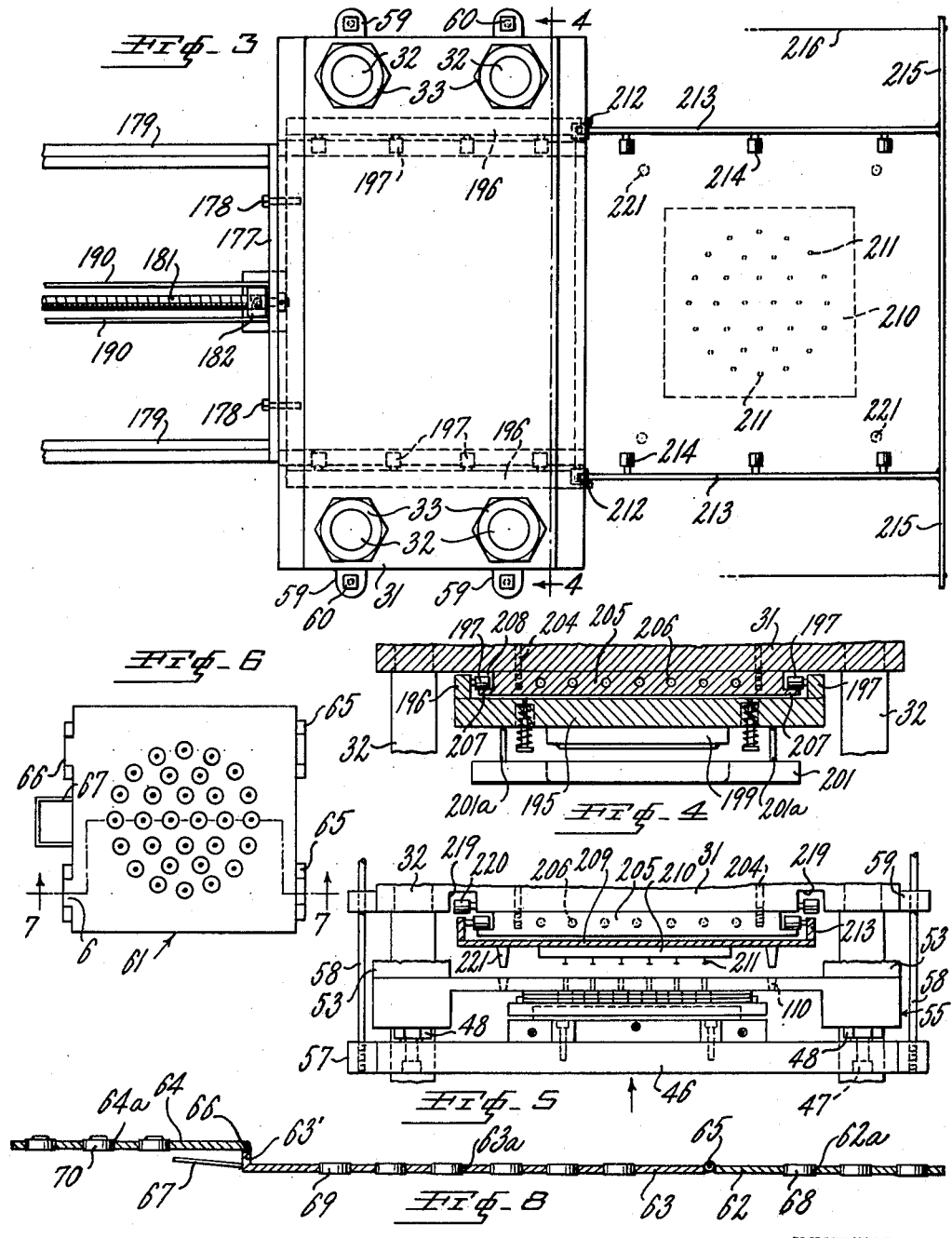

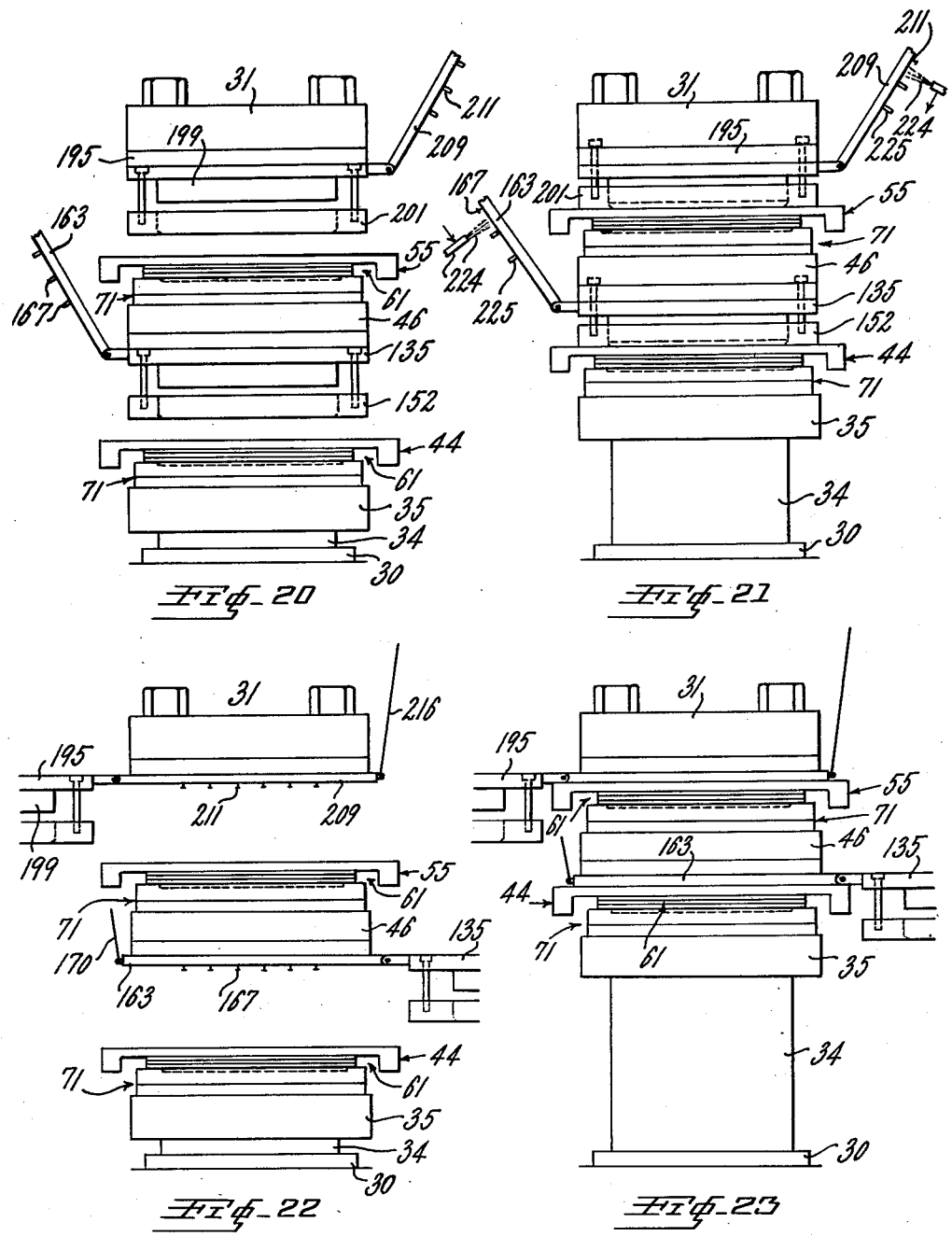

Feb. 25, 1964  H. F. JURGELEIT  3,121,918
MOLDING APPARATUS
Filed April 7, 1960  11 Sheets-Sheet 9
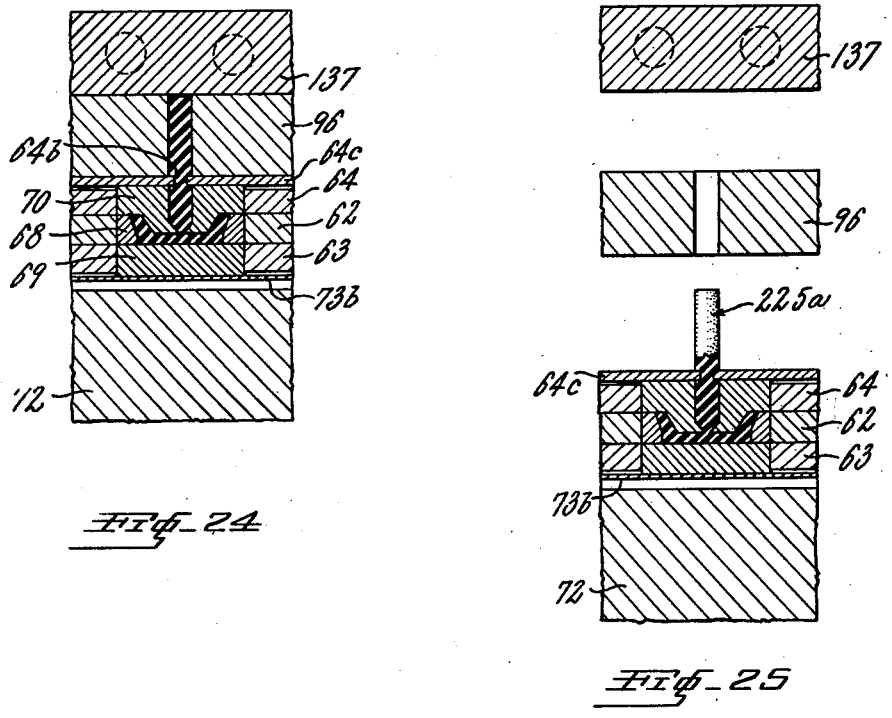
INVENTOR.
HERBERT F. JURGELEIT
BY Paul A Blaustein
ATTORNEY

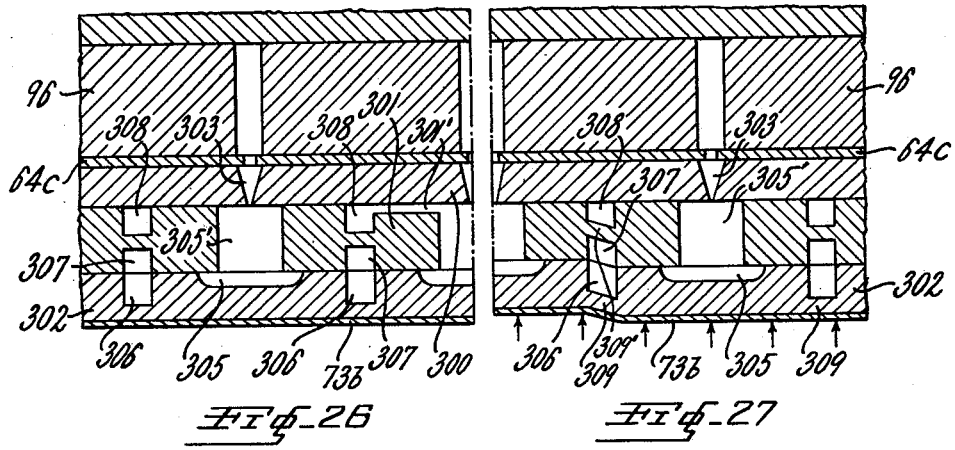
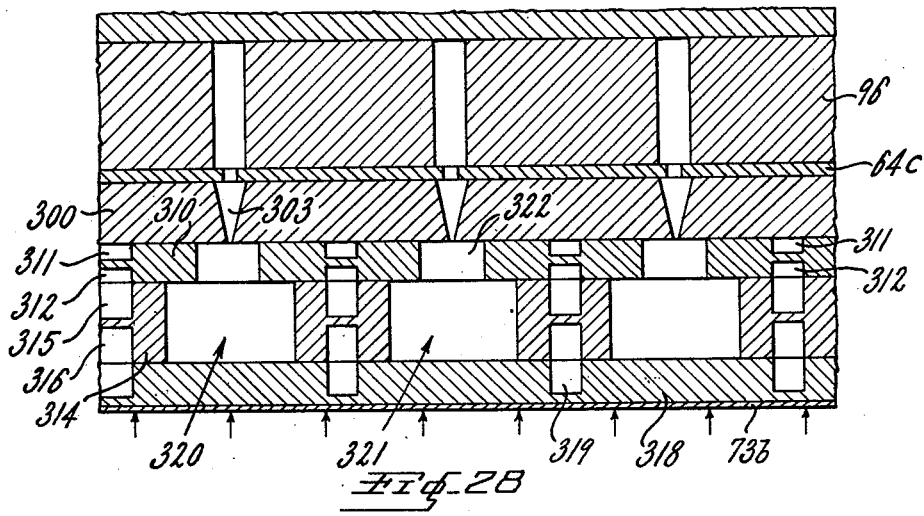

Feb. 25, 1964  H. F. JURGELEIT  3,121,918
MOLDING APPARATUS

Filed April 7, 1960  11 Sheets-Sheet 11

INVENTOR.
HERBERT F. JURGELEIT
BY Paul Blaustein
ATTORNEY

United States Patent Office 3,121,918
Patented Feb. 25, 1964

3,121,918
MOLDING APPARATUS
Herbert F. Jurgeleit, Oceanside, N.Y., assignor to United States Rubber Company, New York, N.Y., a corporation of New Jersey
Filed Apr. 7, 1960, Ser. No. 20,650
23 Claims. (Cl. 18—30)

This invention relates to injection molding machines, and in particular to molding presses for producing flashless molded parts requiring no trimming.

Injection molding operations as presently carried out on known molding presses and like machines and by known molding processes are generally beset by a number of difficulties and entail large expenditures of time and labor. One of the operational difficulties invariably encountered is the occurrence of molding scrap losses, especially in molding operations of the "bottomless cylinder" type. In such operations, the injection piston or plunger engages a mass of molding compound which is located in a substantially bottomless cylindrical cavity so as to force the compound against the sprue plate of the mold. Although a great amount of this molding compound is forced through the sprues of the sprue plate into the mold cavity or cavities, there always remains a sheet or "blanket" of the compound between the piston and the sprue plate at the end of the injection stroke of the former. Inasmuch as the injection piston in conventional press molding processes cannot be retracted from the mold and the injection pressure released without permitting the molding compound to flow out of the mold cavities so as to form the undesired flash on the molded parts, the aforesaid blanket of molding compound represents a complete waste since it must be cured with the injected portion of the compound and cannot be recovered for use during a subsequent injection operation. As a result, the known molding processes (automatic, semi-automatic and non-automatic) based on the injection, cavity-stuffing or compression molding principles are made still more costly by reason of the high costs of trimming, finishing and inspecting the molded articles, high mold maintenance costs, etc. A further operational difficulty always encountered is the formation of flash on the molded parts, especially between mold plates clamped insufficiently during the injection operation and during curing of the injected molding compound. As is well known, the formation of flash results from machining inaccuracies in the mold and/or in the press working surfaces, deformation of the press mold-clamping members under load, and/or the separation of the mold plates after the injection pressure is removed, due to the elastic and thermal expansion of the injected molding compound. The basic reason for this drawback of the known machines and processes is that it has generally been deemed technically impracticable and thus uneconomical to provide means for exerting the necessary clamping pressures from a time starting at or during the injection stage and continuing through the curing stage so as to ensure a flashless operation.

The large molding scrap losses inherent in "bottomless cylinder" injection molding operations cannot be avoided by reducing the initial quantity of molding compound in the injection cylinder. In practice, the amount of the compound charge in the injection cylinder must exceed the actual quantity of the compound required to fill the mold cavities, for a number of reasons. First, as the injection piston approaches its most advanced or "bottoming" position in the cylinder, the space between the front face of the injection piston and the upper surface of the top or sprue plate of the mold becomes too small and the flow resistance within the injection unit to the various sprues becomes too great to effect a complete filling of the various mold cavities at the available injection pressure (usually about 2000 p.s.i.) unless a sufficient excess of the compound is provided for each injection stroke of the piston. This increase in flow resistance of the molding compound is aggravated by the tendency of the same to "skin cure" in the injection unit prior to the completion of the injection operation. Second, even if it were possible to operate without an excess of the molding compound, the cost of precisely weighing or otherwise determining the quantity of molding compound required to make up a charge capable of just filling the mold cavities would be as great or greater than the cost of the scrap compound thus saved. Third, since the molding compound in the bottomless injection cylinder is employed as the means for distributing the mold clamping pressure evenly over all the mold lands, the charge in the injection cylinder cannot be reduced without adversely affecting the magnitude and uniformity of the mold clamping pressure.

Still another operational difficulty encountered in injection molding processes is the occurrence of "backrinding," i.e., defects in the form of cavities, craters and the like, in the molded articles due to the escape of molding compound from the mold cavities during the curing stage and as a direct result of the thermal expansion of the injected molding compound.

It is, therefore, an important object of the present invention to provide novel and efficient injection molding machines which are free of the drawbacks and disadvantages of known molding machines.

Another object of the present invention is the provision of means rendering "bottomless cylinder" type injection molding operations considerably more economical than has heretofore been possible.

A related object of the present invention thus is the provision of means in an injection molding press for substantially eliminating molding scrap losses.

Still another object of the present invention is the provision of a molding press in which the mold plates are clamped together under pressure by means distinct from the injection unit both during and subsequent to the injection operation, whereby the clamping means become active instantaneously with the release of the injection pressure, and in which the portion of the molding compound charge not injected into the mold cavities is separated from the injected molding compound and not cured with the latter.

It is also an object of the present invention to provide an injection molding press in which at least one injection unit of novel construction can be moved into and out of the press and includes also an anti-backrinding device which becomes operative after the injection unit moves out of the press.

A further object of the present invention is the provision of at least one rigid intermediate or auxiliary movable press platen between the upper stationary cross head and ram cap of the press in conjunction with a deformable mold-supporting unit against which multi-plate molds may be clamped by the auxiliary platen so as to compensate for manufacturing tolerances of the molds and to thereby ensure the application of a uniform clamping force to all the molds.

In this connection it is still a further object of the present invention to provide a mold-supporting unit constructed either in the form of a hydraulic pressure capsule having a flexible diaphragm covering a hydraulic fluid-filled chamber and serving as a mold-supporting surface, or in the form of a resiliently deformable capsule of mechanical construction (i.e., using elastomer pad, springs, etc.), so as to afford an elastic or fluid-like foundation for the mold.

Yet a further object of the present invention is the provision, in a press as aforesaid, of a pressure capsule type mold-supporting unit which simultaneously serves as one of the heating platens of the press and is equipped with means for accurately positioning the molds relative to the auxiliary movable press platen.

Still further it is an object of the present invention to provide a press of the aforesaid type in which a floating intermediate cross head positioned between the upper stationary press crosshead and the ram cap defines two operating spaces in the press with each of which are associated a pressure capsule mold-supporting unit, an auxiliary cross head, an injection unit, an anti-backrinding device and means for moving the injection unit and if desired, the anti-backrinding device into and out of the press.

Other objects and advantages of this invention will become apparent from the following description taken in connection with the accompanying drawings, wherein are set forth by way of illustration and example certain embodiments of this invention.

FIG. 1 is a front elevational view of the injection molding press constructed in accordance with the present invention and illustrates the press in its closed condition during an injection operation;

FIG. 1a is a similar front elevational view of the press, partly in section, and illustrates the same in its open condition during mold unloading and cleaning operations;

FIG. 1b is an enlarged, partly sectional front view of a portion of the press shown in FIG. 1 and shows details of a pressure capsule type mold-supporting unit employing a locked-in supply of hydraulic fluid;

FIG. 2 is a sectional view taken along the line 2—2 in FIG. 1a;

FIG. 3 is a top plan view of the press in the closed condition thereof as shown in FIG. 1, with certain parts omitted for the sake of clarity;

FIG. 4 is a sectional view taken along the line 4—4 in FIG. 3 but with the injection unit in the open position;

FIG. 5 is a partly sectional, fragmentary side elevational view of the press as seen from the right-hand side of FIG. 3 and illustrates the press in an open condition preparatory to a curing operation and showing also the auxiliary cross head closed on the mold;

FIG. 6 is a top plan view of a multi-cavity, book-type three-plate mold employed in the press according to the present invention;

FIG. 7 is a sectional view taken along the line 7—7 in FIG. 6;

FIG. 8 is a similar sectional view with the mold in its open or unfolded condition;

FIG. 9 is a sectional view of a pressure-equalizing capsule type mold-supporting unit used in the press according to the present invention employing a variable pressure hydraulic fluid supply;

FIG. 10 is an enlarged, fragmentary, sectional view of a part of the press as shown in FIG. 1 and illustrates more explicitly the injection of molding compound into a mold cavity;

FIG. 11 is a similar view of the same mold cavity during the curing operation subsequent to the injection operation;

FIG. 12 is a perspective view of an article molded in the press according to the present invention;

FIG. 13 is a plan view of the lower part of the press taken along the line 13—13 in FIG. 1, certain details being omitted for the sake of clarity;

FIG. 14 is a sectional view taken along the line 14—14 in FIG. 13;

FIG. 15 is a sectional view taken along the line 15—15 in FIG. 1;

FIG. 16 is a sectional view taken along the line 16—16 in FIG. 1a;

FIG. 17 is a sectional view taken along the line 17—17 in FIG. 1a showing the top of the diaphragm loading capsule with the mold removed;

FIG. 18 is a vertical, partly elevational and partly sectional view of one of the upper set of hydraulic mold-clamping motors employed in the press according to the present invention;

FIGS. 19 to 23 are diagrammatic illustrations of the press according to the present invention in the various stages of operation thereof;

FIGS. 24 and 25 are illustrations of another embodiment of the mold and antibackrinding means of the present invention; and FIGS. 26–29 are illustrations of other embodiments of the mold which may be used therein.

Figure 29:
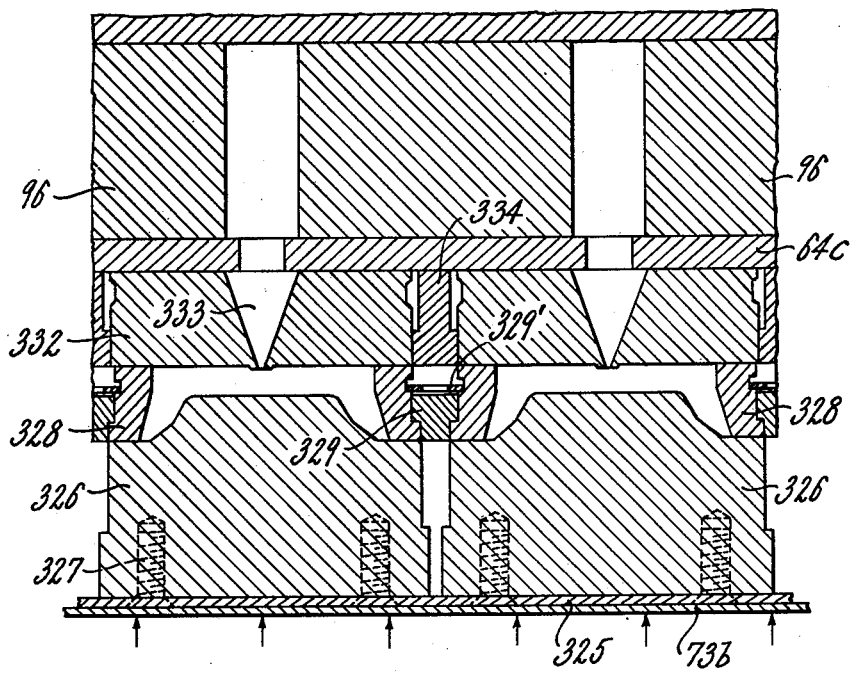

For the purpose of the following description, the term "front" will be employed to designate the viewing plane in FIG. 1 and the bottom of FIGS. 13, 16 and 17, for example, while the term "rear" will be employed to designate the top of FIGS. 13, 16 and 17, for example.

*The Press*

Referring now particularly to FIGS. 1, 1a and 1b, it will be seen that the press according to the present invention comprises a stationary lower cross head 30 and a stationary upper cross head 31 rigidly connected with one another by four tie rods 32 having nuts 33 threaded onto their upper ends (see also FIG. 3). Reciprocally mounted on the lower cross head 30 is a ram 34 which carries at its uppermost end a ramcap 35. The ramcap 35 carries four lateral mounting brackets 36 which are rigidly affixed thereto by means of bolts 37 and support, by means of the latter and bolts 38, four double-acting hydraulic motors 39. Each motor 39 comprises a cylinder 40 provided with fluid flow lines 41 and 42. By means of these lines, hydraulic fluid can be admitted into and exhausted from the opposite ends of the respective cylinders. Reciprocally arranged within each cylinder 40 is a piston (not shown) which carries a piston rod 43 extending upwardly from the cylinder. The piston rods 43 at their uppermost ends support a structural element 44 (hereinafter referred to as an auxiliary cross head) the construction and function of which will be more fully explained presently. The auxiliary cross head 44 is rigidly connected with the piston rods 43 by means of headed bolts 45 extending through suitable bores provided in the four corner regions of the auxiliary cross head, the bolts 45 being threaded into the uppermost ends of the respective piston rods 43.

Slidably mounted on and guided by the tie rods 32 of the main press frame between the lower stationary cross head 30 and the upper stationary cross head 31 is an intermediate press platen 46 which is provided at its corners with a plurality of bores accommodating a plurality of headed bolts 47 extending upwardly through the intermediate platen. The bolts 47 are threaded into the lowermost ends of a plurality of piston rods 48 connected, respectively, with pistons 48a (see FIG. 18) reciprocally arranged in the cylinders 49 of a second set of four double-acting hydraulic motors 50. Each cylinder 49 is provided with hydraulic fluid lines 51 and 52 and is mounted on a block 53 to which it is rigidly connected by means of bolts or tie rods 54. Each of the four blocks 53 is substantially T-shaped in vertical cross-section, having a relatively wide portion 53a (see also FIG. 16) to which the associated cylinder is connected and a relatively narrow portion 53b extending downwardly from the wider portion 53a. The narrow portions 53b of the mounting blocks 53 extend, respectively, through a plurality of bores provided in a structural element 55 (hereinafter also referred to as an auxiliary cross head) the construction and function of which will be more fully explained presently. The narrow block portions 53b are threaded at their lowermost ends which project below the auxiliary cross head 55, and nuts 56 are threaded onto these block portions. In this manner, the auxiliary cross head 55 is rigidly connected with and supports the cylinders 49.

From the foregoing it will be understood that the molding press in accordance with the present invention is provided with two operating spaces, one of which is located between the lower stationary cross head 30 and the press platen 46, and the other of which is located between the press platen and the upper stationary cross head 31. As clearly shown in FIGS. 1, 1a, 16 and 17, the intermediate press platen 46 is provided at its front and rear edges with projections 57 into which are threaded the lowermost ends of a plurality of elongated rods 58 which extend slidably through corresponding projections 59 provided on the upper cross head 31. The rods 58 are provided with heads 60 at their upper ends which heads, being engageable with the projections 59 from above the latter, limit the extent of downward movement of the said rods 58 relative to the upper cross head 31. The intermeditae movable press platen 46 thus effectively floats between the upper and lower stationary cross heads and can move between two extreme positions illustrated, respectively in FIGS. 1 and 1a.

The Mold

In one form of the invention I employ in conjunction with the press a plurality of molds 61 of the multi-plate, multi-cavity type. Referring in particular to FIGS. 6, 7 and 8, it will be seen that each mold 61 is composed of three carrier plates 62, 63 and 64. The plate 62 is connected at one side to the plate 63 by means of a hinge joint 65. The plate 63 at the side thereof remote from the hinge joint 65 is provided with an upstanding flange 63' to the uppermost edge of which the plate 64 is connected by means of a hinge joint 66. The plate 63 is further provided at the outside of the base of the flange 63' with a grip or handle 67 by means of which the mold may be manipulated and moved into or out of the press as will be more fully described hereinafter. Formed in the plates 62, 63 and 64, respectively, are sets of apertures 62a, 63a and 64a, the number and distribution of such apertures in each plate being exactly the same as the number and distribution of the apertures in the other plates.

The plate 62 carries a plurality of inserts 68 each of which is retained in a respective one of the apertures 62a and has an axial height slightly larger than the thickness of the plate 62. In a similar manner, the plate 63 supports a plurality of inserts 69 each of which is retained in a respective one of the apertures 63a, while the plate 64 supports a plurality of inserts 70 each of which is retained in a respective one of the apertures 64a, the axial height of each of the inserts 69 being slightly larger than the thickness of the plate 63, and the axial height of each insert 70 being slightly larger than the thickness of the plate 64. As clearly shown in FIGS. 1b, 10 and 11, the inserts 69 are entirely imperforate so that when they are fixed in position carrier plate 63 is entirely imperforate. Each insert 68, on the other hand, is provided with a central recess or cavity 68a, while each insert 70 is provided with a central projection 70a at one face and with a central bore 70b extending entirely through the insert. The carrier plates 62, 63 and 64 can be folded together, as shown in FIG. 7 so as to bring each insert 68 carried by the plate 62 into contact with one respective insert 69 carried by the plate 63 and with one respective insert 70 carried by the plate 64. Thus, each triad of inserts 68, 69 and 70 defines a mold cavity having the shape of the articles to be produced, as illustrated in FIG. 12, with the bore 70b being the sprue for that mold cavity. Other types of construction may be found more suitable for certain applications. For example, mold plate 64 may be made solid and imperforate without movable inserts and movable inserts will only be in plates 62 and 63.

Mold Supporting Unit

As is well known, in the ordinary "bottomless cylinder" type of injection molding operation each mold is normally supported with its bottom element on a rigid surface and its top or sprue element contacted by a charge of molding compound in an injection cylinder in which the injection plunger acts to force the molding compound through the open cylinder bottom and the sprue of the mold into the cavity thereof. The molding compound thus ensures a uniform distribution of pressure over the entire cavity area of the mold so as to prevent any escape of molding compound between the mold lands during the injection operation. This procedure, however, always entails a soiling of the outer surface of the top mold element and also leads to the occurrence of considerable molding scrap losses inasmuch as any portion of the molding compound charge not injected into the mold cavity must still remain in contact with the top mold element during the curing operation to avoid any relaxation of the mold-closing pressure and thus to prevent escape of the injected molding compound from the mold cavity (backrinding) as well as to prevent separation of the mold elements under the force of the thermally expanding injected molding compound. The present invention, in accordance with the hereinbefore stated objects thereof, provides means for eliminating these drawbacks while retaining all of the advantages of the bottomless cylinder injection molding techniques without rendering the entire molding operation uneconomical.

Referring again to FIGS. 1, 1a and 1b in conjunction with FIGS. 10 and 17, it will be seen that there are mounted on the ramcap 35 and the intermediate platen 46, respectively, a pair of mold-supporting units 71 which are identical in all respects. Each mold-supporting unit 71 consists of a bottom member 72 and a top member 73. The bottom member 72 comprises a relatively wide and square or rectangular base portion 72a and a relatively smaller upper portion 72b of circular cross-section, while the top member 73 comprises a relatively thick and square or rectangular outer frame portion 73a and a relatively thin diaphragm portion 73b extending across the circular space defined between the sides and within the confines of the frame portion 73a. The internal dimensions of the frame portion 73a of the top member 73 are slightly larger than the exterior dimensions of the upper portion 72b of the base member 72 to enable the essentially cup-shaped top member 73 to be fitted over the upper portion 72b of the base member 72.

The top member 73 is connected with the base member 72 by means of bolts 74 extending through shouldered bores 75 formed in the four corners of the frame portion 73a of the top member 73. By referring to FIG. 1b, it is to be noted that although members 72 and 73 are connected together relative motion between members 72 and 73 is allowable. Each bolt 74 comprises a wide head 74a, a relatively narrower shank 74b, and a still narrower threaded end portion 74c, the latter being received, respectively, within internally threaded bores provided in the upper surface of the base portion 72a of the bottom member 72. The extent to which the top member 73 can be drawn toward the bottom member 72 is determined by the engagement of the shoulder formed between the bolt portions 74b and 74c with the upper surface of the base portion 72a of the bottom member 72. Thus, there is defined a relatively narrow space or chamber 76 between the upper surface of the top portion 72b of the bottom member 72 and the lower surface of the diaphragm portion 73b of the top member 73. The joint between the outer peripheral surface of the said top portion 72b and the inner peripheral surface of the frame portion 73a of the top member 73 is sealed by an O-ring 77 suitably accommodated in conjunction with a pair of back-up rings 78 in a groove or channel 79 formed in the outer peripheral surface of the top portion 72b of the base member 72.

The bottom member 72 of each mold-supporting unit 71 is further provided with a transverse bore 80 which communicates at its inner end with an axial bore 81 and, in accordance with one embodiment of the invention, is closed at its outer end by a plug 80a. The bore 81 communicates with the chamber 76 defined beneath the diaphragm 73b. The chamber may thus be filled with an essentially incompressible, preferably high temperature resistant hydraulic fluid which can be permanently (excepting leakage, of course) confined or locked therein for a purpose which will be more fully explained presently. In accordance with another embodiment of the invention, as shown in FIG. 9, the bore 81 is not plugged up but remains in communication with a conduit 80b connected to a source of variable pressure which may be constituted by the low and high pressure hydraulic systems (not shown) of the press or by a pump or the like. If desired, such a pump may be a low pressure pump, in which case a check valve (not shown) must be incorporated in the conduit 80b. This check valve thus serves the same purpose as the plug 80a and effectively locks the hydraulic fluid in the chamber 76 except for possible leakage past the check valve, and the pump, therefore, acts merely as a means for replenishing the supply of hydraulic fluid in the chamber 76 as necessary. The hydraulic fluid may be either oil or water. In order to facilitate the expulsion of air from the chamber 76 during the filling thereof, there is provided in the bottom member 72 a bleed conduit 82 one end of which communicates with the chamber and the other end of which is normally closed by a plug 82a (FIG. 1b) once the chamber has been completely filled.

Also provided in the bottom member 72 of each mold-supporting unit 71 is a substantially zigzagging passageway 83 which communicates at its opposite ends with a pair of conduits 84 and 85 by means of which steam or other heating fluid may be admitted into and exhausted from the said bottom member. At its front and rear edges, the top member 73 of each mold-supporting unit 71 is provided with a pair of upstanding guide rails 86, while at one of the remaining sides each top member 73 is provided with an abutment or stop rail 87. In this manner, an accurate positioning of the molds atop the respective supporting units is always assured. The lower one of the mold supporting units 71 is affixed to the top of the ramcap 35 by means of bolts 88 (FIG. 1b) extending through lugs 89 projecting from the base portion 72a of the respective bottom member 72, while the upper one of the mold-supporting units 71 is affixed to the upper surface of the press platen 46 by means of bolts 90 extending through lugs 91 projecting from the base portion of the corresponding bottom member.

Inasmuch as the mold plate 63 has a number of inserts 69 which protrude below the bottom of the plate, the flexible diaphragm 73b provides pressure against each insert individually, and therefore any insert can be deflected by the diaphragm without necessarily deflecting another insert. It is to be noted that insert 69 may be of such dimension that it does not protrude below the bottom of the plate, and may in fact be within the aperture defined by the mold plate. In this case, the cushioning action of the flexible diaphragm will still provide individual insert deflection because the diaphragm will enter the bottom portion of the aperture and will exert the necessary pressure against the bottom of the insert. Thus, whenever an insert 69 is moved, the cooperating inserts 68 and 70 are moved respectively. Further, inasmuch as each set of mold inserts 68, 69, 70 are movable independently of any other set of mold inserts, each insert may be thicker or thinner than its respective carrier plate.

It is also possible to use molds without cavity inserts, each mold plate being so constructed to provide the essential independent mold cavity action. As used herein, independent mold cavity action means that each mold cavity which contains the molding material, responds to pressure independently of the other mold cavities. This may be accomplished by providing recessed grooves around each individual cavity in each mold plate having proportions which provide the necessary flexibility. If for example any mold plate is so thin that it provides a high degree of flexibility, these recessed grooves may be unnecessary. In any event, the key to independent mold cavity action, is the provision of a flexible bottom mold plate which is in contact with diaphragm 73b. This flexible plate must be readily deformable in response to varying pressures which will be applied to the plate by diaphragm 73b. Therefore this plate will be able to adapt itself to many shapes and have many regions of widely varying curvatures, depending of course on the pressure applied by diaphragm 73b.

FIGS. 26–29 show molds which illustrate these principles. FIGS. 26 and 27 illustrate the same mold in two different conditions. FIG. 26 shows the mold in a static condition, i.e., when diaphragm 73b does not apply any pressure; FIG. 27 shows the mold in the dynamic condition, i.e., when diaphragm 73b applies a uniform pressure to a non-uniform surface.

The mold contains three plates, a top plate 300, an intermediate plate 301 and a bottom plate 302. Intermediate sprue plate 64c and adaptor plate 96 are shown and will be described hereinafter. The top plate 300 has a number of apertures 303 which form the sprue cavity to receive the mold compound. The intermediate plate 301 has a pattern of mold cavities 305' of a predetermined shape and the bottom plate 302 also has a pattern of mold cavities 305. Cavities 305' and 305 communicate to form the entire mold cavity. Intermediate plate 301 is made flexible by providing a number of recesses 307, 308 therein. The essential feature of the mold is that the bottom plate 302 is made flexible by providing a plurality of spaced recesses 306 in the upper surface thereof. A gap 301' is shown on the upper surface of intermediate plate 301 to represent a machining inaccuracy made during mold manufacture which is closed to some extent when 301 is deflected upwards. As shown in FIG. 27, when pressure is applied, the plate 302 can easily flex and conform to the pressure applied by diaphragm 73b because the recesses 306, 307 and 308 result in thin, readily deformable sections 309 and 309' which do not have the strength to resist an applied force and deflect easily in correspondence with the force. Also, plate flexibility permits diaphragm 73b to close up on gap 301' and avoid flash on the molded part.

FIG. 28 shows a mold which is similar in principle. There is shown the mold top plate 300 with sprue cavities 303 therein, upper and lower intermediate plates 310, 314 with spaced recesses 311, 312 and 315, 316 respectively. The bottom plate 318 does not have a mold cavity such as plate 302 at 305 in FIG. 26 and the entire mold cavity 320 in FIG. 28 is formed by the cavities 321 and 322 of the upper and lower intermediate plates. The bottom plate 318 does have a number of spaced 319 recesses in the upper surface to impart the desired flexibility.

Another type of mold is shown at FIG. 29 and comprises a thin bottom plate 325. Recesses are not required because this plate does not have sufficient thickness to resist the pressure applied by diaphragm 73b. With this plate, a number of mold inserts are used, but mold plates of the character of 310 and 314 previously described may be used. The mold cavity is formed by a number of inserts 326 which are fastened to the bottom plate 325 by screws 327. The upper surface of insert 326 defines the bottom region of the mold cavity. The remaining contour of the mold cavity is formed by intermediate inserts 328 which are held in spaced apart relation by insert retainer plate 329 and are prevented from dropping out of retainer plate 329 during opening of the mold by conventional type snap rings 329'. Inserts 332 form the upper surface of the mold cavity and contain the sprue cavity 333. These inserts are also fixed in spaced apart relationship by mold top plate 334. This construction permits close cavity spacing, less wear and tear on the diaphragm 73b and usually involves less mold cost.

*Mold Clamping Means*

The lower auxiliary cross head 44 (FIG. 1b) comprises a pair of spaced, parallel, rigid, elongated side members 92 of substantially rectangular cross-section which are interconnected with one another at the tops thereof by a horizontal web 93 provided with a circular central opening or recess 94. The side members 92 are further interconnected with one another adjacent their front and rear ends and below the web 93 by a pair of parallel, vertical webs 93a which are arranged in respective planes set in somewhat from the front and rear end planes of the side members 92 for a purpose presently to be explained. Thus, the cross head 44 in plan is substantially H-shaped.

The edge of the web 93 defining the opening 94 is provided in its upper region with an inwardly directed annular flange 95 (see especially FIGS. 1b and 10) which partly overlies the recess 94. A rigid circular plate 96 of the same thickness as the web 93 and having an outwardly directed annular flange 97 is positioned across and retained in the recess 94 with the upper surface of the said flange 97 engaging the lower surface of the web flange 95. It is more desirable to have the circular plate 96 thicker than the web 93 in order to provide clearance for web deflection. The plate 96 is affixed to the web 93, so as to constitute a part of the auxiliary cross head 44, by means of a plurality of screws or bolts 98 extending through both the flanges 95 and 97 and spaced from one another peripherally of the recess 94 and plate 96. Provided in the center plate 96 is a plurality of vertical bores or passageways 99 extending therethrough, the number and distribution of such bores corresponding to the number and distribution of the sprue-constituting bores 70b in the mold inserts 70 disposed in the carrier plate 64 of a specified mold 61. It will, therefore, be understood that any given plate 96 can be removed from the auxiliary cross head 44 and replaced by a different plate 96 the bores or passageways 99 of which are arranged in accordance with the sprue characteristics of a different mold 61.

As clearly shown in FIGS. 1, 1a and 1b, the piston rods 43 of the lower set of hydraulic motors 39 are connected to the side members 92 of the auxiliary cross head 44 adjacent the front and rear ends of these side members. Moreover, the central part of the cross head 44, constituted by the horizontal web 93 and perforated plate 96, overlies the ramcap 35 and the mold-supporting unit 71 mounted thereon, and thus also the operative position of a mold 61 when the same is disposed on the top member 73 of the lower mold-supporting unit 71. For a purpose which will presently become clear, the horizontal web 93 of the auxiliary cross head 44 is provided adjacent the four corners thereof with four tapered bores 100.

The construction of the upper auxiliary cross head 55 is substantially the same as that of the lower auxiliary cross head 44. Referring particularly to FIGS. 1b and 16, it will be seen that the auxiliary cross head 55 comprises a pair of spaced, parallel, rigid, elongated side members 101 of substantially rectangular cross-section which are interconnected with one another at the tops thereof by a horizontal web 102 provided with a circular central opening or recess 103. The side members 101 are further interconnected with one another adjacent their front and rear ends and below the web 102 by a pair of parallel, vertical webs 104 which are arranged in respective planes set in somewhat from the front and rear end planes of the side members 101. Thus, the cross head 55, like the cross head 44, is substantially H-shaped in plan.

The edge of the web 102 defining the opening 103 is provided in its upper region with an inwardly directed annular flange 105 which partly overlies the recess 103. A circular plate 106 of the same thickness as the web 102 and having an outwardly directed annular flange 107 is positioned across and retained in the recess 103 with the upper surface of the flange 107 engaging the lower surface of the web flange 105. Again, it is more desirable to have the circular plate 106 somewhat thicker than the web 102 in order to provide clearance for web deflection. The plate 106 is affixed to the web 102, so as to constitute a part of the auxiliary cross head 55, by means of a plurality of screws or bolts 108 extending through both the flanges 105 and 107 and spaced from one another peripherally of the recess 103 and plates 106. The latter, which is consequently removable and replaceable in the same manner as the plate 96 of the auxiliary cross head 44, is provided with a plurality of vertical bores or passageways 109 extending therethrough, the number and distribution of such bores also corresponding to the number and distribution of the sprue-constituting bores 70b in the mold inserts 70 disposed in the carrier plate 64 of a specified mold 61. The horizontal web 102 of the upper auxiliary cross head 55 is further provided adjacent its four corners with four tapered bores 110.

As clearly shown in FIG. 16, the mounting blocks 53 for the cylinders 49 of the hydraulic motors 50 are mounted on the side members 101 of the upper auxiliary cross head 55 adjacent the front and rear ends thereof, and the central part of the auxiliary cross head 55, constituted by the horizontal web 102 and the perforated plate 106, overlies the intermediate cross head 46 and the mold-supporting unit 71 mounted thereon, and thus also the operative position of the upper mold 61 when the same is disposed on the top member 73 of the upper mold-supporting unit.

The purpose of the H-shaped construction of the lower and upper auxiliary cross heads 44 and 55 will now be apparent. The inward positioning of the transverse webs 93a of the auxiliary cross head 44 and the transverse webs 104 of the auxiliary cross head 55 relative to the respective front and rear end planes of the associated side members 92 and 101 is necessary to enable the auxiliary cross heads to clear the front and rear tie rods 32 of the press which extend from the upper cross head 31 to the lower main cross head 30.

*Injection Unit*

In accordance with the present invention, there is associated with each of the operating spaces of the press a respective injection unit and anti-backrinding device. Referring now to FIGS. 1, 1a and 13 to 15, it will be seen that there is positioned adjacent one side of the machine a framework consisting of a flat-surfaced horizontal platform 111 supported at its four corners by legs 112, 113, 114 and 115. Rigidly affixed to the underside of the platform 111 by means of screws or bolts 116 are two rails 117 defining a pair of tracks 118, the rails being disposed parallel to one another and extending from respective locations intermediate the legs 112 and 115 toward the opposite end of the platform 111. Also affixed to the underside of the latter adjacent the end thereof facing the press is a vertically depending bearing plate 119 from which a pair of parallel guide members 120 extend toward the end of the platform 111 facing away from the press and up to a second bearing plate or member 121 depending downwardly from and affixed to the platform 111. Journaled in the bearing members 119 and 121 is an elongated lead screw 122 one end of which projects through the bearing member 121 and is connected by means of a sprocket chain or like transmission belt 123 to the output shaft 124 of a reducing gear mechanism 125. The reducing gear mechanism is driven by an electric motor 126, both the motor and the reducing gear housing being mounted on the same supporting surface as the legs 112 to 115.

Mounted on the lead screw 122 is an internally threaded square nut or block 127 the upper portion of which is slidably confined between the guide members 120, the block 127 thus being arranged for reciprocal movement along the screw 122 and being prevented from rotating with the screw by the guide members 120. The block 127 carries a pair of horizontal laterally extending arms 128. At their outermost ends, the arms 128 are provided with vertically depending arms 129 which are provided at their lowermost ends with horizontal portions 130 extending toward the press. The arm portions 130, at their free ends, carry a pair of vertical pins 131 which extend upwardly to a level slightly below the lower surface of the platform 111. The uppermost ends of the pins 131 are slidably received, respectively, in a pair of bores 132 (FIGS. 1 and 14) formed in a pair of connecting arms 133 at one end of the latter. At their other ends, the connectnig arms 133 are fixed, as by bolts 134, to an injection unit carrier member 135.

Referring in particular to FIGS. 13 and 15, it will be seen that the intermediate press platen 46 rigidly supports at its lower surface and through the intermediary of bolts or screws 136 a plate member 137 which is provided with a plurality of bores or passageways 138 through which steam or other heating fluid may be fed. At its front and rear edges, the plate member 137 is provided with a pair of horizontal flanges 139 which are spaced from the lower surface of the intermediate cross head 46 and thus define a pair of parallel tracks 140. The injection unit carrier member 135 is provided adjacent its front and rear edges with a pair of upwardly extending ledges 141 in each of which are journaled a number of horizontal rollers 142 which are adapted to ride in the tracks 139 and 140, respectively. The arrangement is such that when the intermediate press platen 46 is at its lowermost location, as determined by the rods 58—60 (see FIG. 1a), the tracks 140 are in precise longitudinal alignment with the tracks 117 arranged at the underside of the platform 111.

From the foregoing it will be understood that, with the intermediate press platen in its lowermost position, the lead screw 122 may be rotated by the motor 126 through the intermediary of the transmission means 123—124—125 so as to move the block 127 along the screw and thereby to draw the injection unit carrier member 135 from the intermediate platen to the platform 111, i.e., out of the press, or to push the injection unit carrier member from the platform to the intermediate platen, i.e., into the press. In this connection it is to be noted that the respective lengths of the tracks 117—117 and 140—140 are sufficient to accommodate all of the rollers 142 when the injection unit is moved out of or into the press. In order to prevent excessive travel of the block 127 and thus of the injection unit carrier member 135 in one direction or the other, there are provided on the bearing members 119 and 121 two limit switches 143 and 144 which are adapted to be engaged by the block 127 so as to interrupt the operation of the drive motor 126.

Referring now to FIGS. 1a and 1b in conjunction with FIG. 15, it will be seen that the injection unit carrier member 135 is provided adjacent its four corners with four vertical recesses 145 in each of which is fixedly arranged a headed guide pin 146. Slidably surrounding each of the guide pins 146 in the recesses 145 is a sleeve 147, the innermost end of each sleeve being narrowed, as shown at 148, to prevent dropping of the sleeves downwardly past the heads of the pins 146. At their outer ends, the sleeves 147 are provided with annular outer flanges 149 against which bear respective compression springs 150 the other ends of which bear against the innermost ends of the recesses 145. The springs 150 thus bias the sleeves or presser feet 147—149 outwardly of the respective recesses 145.

The injection unit per se carried by the member 135 comprises a piston member 151 and a cylinder member 152 (FIGS. 1a, b). The piston member 151 is rigidly connected to the underside of the carrier member 135 and extends downwardly therefrom. The cylinder member 152 is provided with a central cavity 153 in which the piston member 151 is received with a snug sliding fit. At its bottom the cylinder member 152 is provided with an opening 154 defining the discharge end of the injection cylinder. The opening 154 is covered by a metallic or nonmetallic plate 155 (FIG. 15) which is affixed to the bottom of the cylinder member 152 by screws or bolts 156 and is provided with a plurality of openings 157. The number and distribution of the openings 157 in the cylinder end plate 155 correspond to the number and distribution of the bores or passageways 99 in the center plate 96 of the lower auxiliary cross head 44.

Fixedly connected to the cylinder member 152 and extending upwardly from the four corners thereof are guide bolts 158 (FIG. 1b). These guide bolts extend slidably through respective bores 159 formed in the injection unit carrier member 135. Each of the bores 159 is enlarged at its uppermost end region, as shown at 159a, whereby corresponding horizontal annular shoulders 159b are formed in the carrier member 135. The guide bolts 158 are provided with heads 160 at their upper ends which heads are adapted to slide through the enlarged bores 159a and to engage the shoulders 159b so as to limit downward movement of the cylinder member 152 relative to the carrier member 135 and the piston member 151. The cylinder member when substantially fully raised is urged downwardly by the spring-biased presser feet 147—149, and the lengths of the bolts 158 are so predetermined that when the cylinder member 152 is in its uppermost position relative to the carrier member 135 and the piston member 151, the heads 160 project above the top plane of the roller-carrying ledges 141 affixed to the carrier member 135. In order to accommodate the guide bolt heads 160 at such a time, there are provided in the lower surface of the intermediate cross head 46 suitably dimensioned recesses 161.

*Anti-Backrinding Device*

Associated with the injection unit 151—152 as means for preventing the occurrence of backrinding during the curing of injected molding compound. Referring further to FIGS. 1, 1a and 13, it will be seen that there are provided two pivot pins 162 at those ends of the front and rear ledges 141 of the injection unit carrier member 135 remote from the connecting arms 133. Pivotally connected to the carrier member 135 by means of the pivot pins 162 is an interposer plate 163 which is provided at its front and rear edges with upwardly extending ledges 164 which support a plurality of rollers 165 at their inwardly directed faces. The rollers are adapted, when the plate 163 is horizontal, to enter the tracks 140 for movement of the plate 163 into a position underlying the intermediate movable press platen 46. Rigidly affixed to the lower surface of the interposer plate 163 is a plate 166 from which project a plurality of sprue-pulling pins 167 each having a small head 167a (see FIG. 11). This head acts as a shoulder to provide mechanical anchorage in the cured sprues when such sprues are pulled out. The number and distribution of the plug pins 167 correspond to the number and distribution of the bores 99 in the center plates 96 of the lower auxiliary cross head 44. Also extending downwardly from the plate 163 are four tapered dowel pins 168 which are adapted, when the plate 163 is located beneath the intermediate press platen 46, to be aligned with and received in the bores 100 provided in the horizontal web 93 of the lower auxiliary cross head 44 so as to ensure an accurate positioning of the plate 163 and of the pins 167 relative to the said auxiliary cross head and the bores 99 thereof.

For the purpose of moving the plate 163, when not in use, out of the way of the operator, there is provided a pair of weight members 169 which are attached to and suspended from cables 170 passing over pulleys 171 and connected to a pair of transverse arms 172 connected to the free end of the plate 163. Movement of the latter to and from its position underneath the intermediate press platen 46 is facilitated by a pair of rollers 173 journaled at the front and rear edges of a lateral recess 174 (see FIG. 17) of the intermediate press platen 46 in such positions as to be in rolling contact with the upper edges of the front and rear ledges 164 of the interposer plate 163.

The interposer 163 and the associated bottom plate 166 which carries the undercut studs 167 serves not only as a means of removing the cured sprues from the mold cavity defined by the circular adapter plate of the auxiliary cross head 44, but also to prevent backrinding by providing a fixed cover over the mold cavity which prevents the escape of injected mold compound during the curing step which would ordinarily occur because of the thermal expansion of the molding compound.

By referring to FIGS. 24 and 25, it is seen that the heretofore disclosed interposer elements 163, 166 and sprue pulling pins are entirely eliminated. In this preferred modification, there is shown the multiplate mold 64, 62, 63 positioned on the diaphragm 73b of the mold supporting pressure capsule. On top of carrier plate 64, another interposer or intermediate sprue plate 64c is firmly attached at the edges thereof. This plate 64c may be made separate or integral with carrier plate 64 as desired.

The interposer or sprue plate contains a plurality of apertures, one for each sprue. The diameter of each aperture is somewhat less than the diameter of the sprue holes in the mold top plate 64 and in the adapter plate carried by the auxiliary cross head. These restrictions or necks 64b provide mechanical anchorage for the cured compound in the sprue holes to pull these cured sprues out of the auxiliary cross head adapter plate. It should be noted that the diameter of the sprue aperture at the region which communicates with the mold cavity is much narrower than the diameter of the aperture defined by necks 64b. This is necessary in order to facilitate a clean rupture of the cured sprue 225 (FIG. 11) or 225a (FIG. 25) from the molded article.

FIG. 24 indicates the condition in which the mold cavities have been injected, the injection unit 135, 151, 152 removed from the press, the mold and auxiliary cross head adapter plate 96 clamped by press ram against an upper steam platen 137 and the compound in the mold cavities and sprue passages undergoing cure. It will be noted that the interposer 163, 166 and undercut studs 167 have been dispensed with; the auxiliary cross head adapter plate 96 is clamped directly against steam platen 137, which is affixed to the underside of the intermediate movable press platen 46. The steam platen 137 also performs the anti-backrinding functions of the former interposer 163, 166, as well as furnishing heat for the curing of the molded parts.

FIG. 25 represents the condition in which the press has been opened after the completion of the cure and the auxiliary cross head 93 with its adapter plate 96 raised or separated from the mold. Because of the mechanical anchorage afforded by the partial restrictions in the intermediate sprue plate 64c, the cured sprues are pulled out of the sprue holes in the auxiliary cross head, adapter plate 96 and are retained by the intermediate sprue plate. The cured sprues are removed from the intermediate sprue plate (and mold top plate) by the operator when the mold is withdrawn from the press for stripping or unloading.

When the interposer or intermediate sprue plate 64c is utilized, the interposer means 163 and its associated elements 166, 167 and the dowel pins 168 are disconnected from the machine by the operator. The same holds true for the upper interposer means 213. Therefore, when the machine is ready for curing under these circumstances circular plate 96 of the auxiliary crosshead 44 (FIG. 1a) rests against plate 137 of the intermediate platen means 46 (FIG. 15). Thus plate 137 serves to cover the sprues as shown in FIG. 24, and prevents backriding. Similarly plate 106 of the upper auxiliary crosshead 55 will rest against plate 205 (FIGS. 4 and 5) carried by the upper stationary cross head 31 which will perform the antibackrinding function.

*Upper Press*

As hereinbefore stated, a second combination injection unit and anti-backrinding device is associated with the upper operating space of the press according to the present invention. Referring now to FIGS. 1, 1a and 2 to 5, it will be seen that to this end there is positioned adjacent the side of the press opposite to that where the platform 111 is located a framework consisting of a pair of vertical legs 175 spaced from the press and a pair of horizontal girders or supporting members 176, preferably in the form of channel irons as shown in FIG. 2, which are attached at one end to the uppermost ends of the legs 175, respectively, and extend toward the upper stationary cross head 31 of the press. At their other ends, the supporting members 176 are interconnected with one another by a vertical bearing plate 177 which is rigidly affixed to the press cross head 31 by bolts or screws 178.

Rigidly affixed to the uppermost corners of the vertical bearing plate 177 are two angle irons 179 which extend parallel to the supporting members 176 in the direction of the legs 175 and are interconnected at their outermost ends by a second vertical bearing plate 180 the lowermost edge of which is welded to the supporting members 176. Rotatably journaled in the bearing plates 177 and 180 is a lead screw 181 on which is mounted an internally threaded block or nut 182. One end of the lead screw 181 projects through the bearing plate 180 and carries a sprocket wheel 183 which is connected by a sprocket chain 184 to another sprocket wheel 185 mounted on the output shaft 186 of a reducing gear mechanism 187 which in turn is connected to a drive motor 188, both the reducing gear mechanism and the motor being mounted on a supporting platform 189 extending across and affixed to the angle irons 179 adjacent the outermost ends thereof.

Connected to and depending from the underside of the supporting platform 189 are two spaced guide members 190 which extend from the platform toward the cross head 31 of the press and are connected at their other ends to the bearing plate 177. The uppermost portion of the block or nut 182 is slidably received in the space between the guide members 190 which, consequently, inhibit any rotation of the block 182. Thus, upon rotation of the lead screw 181 in one direction or another by the motor 188 through the intermediary of the transmission means 183 to 187 the block 182 will be moved correspondingly along the lead screw 181. As in the case of the first injection unit, limit switches 191 and 192 are provided on the bearing members 177 and 180, respectively, to the interrupt operation of the motor 188 when the block 182 reaches the opposite limits of its travel.

Fixedly connected to and depending downwardly from the block 182 is a short rod 193 the lowermost end of which is connected with a projection or arm 194 extending from an injection unit carrier member 195. The carrier member 195 is provided at its upper front and rear edges with a pair of ledges 196 on which are journaled respective sets of rollers 197. The rollers are received when the block 182 is in the position of FIG. 1a, in a pair of tracks 198 defined by a pair of channel irons 198a (see also FIG. 2) rigidly affixed to the undersides of the supporting members 176. At its lower surface, the injection unit carrier member 195 supports a piston member 199 as well as a plurality of spring-biased presser feet 200 the construction and arrangement of which is precisely the same as that of the spring-biased presser feet 149 illustrated in FIG. 1b. A cylinder member 201 is supported by the carrier member 195 through the intermediary of headed guide bolts 201a for axial movement relative to the piston member, the cylinder member 201 being provided with a central cavity 202 dimensioned to receive the piston member 199 with a snug sliding fit. The bottom opening of the cylinder member 201 is covered by a perforated plate 203 similar to the plate 155 illustrated in FIG. 1b and provided with a plurality of openings 203' the number and distribution of which correspond to the number and distribution of the sprue-constituting bores 109 in the center plate 106 of the upper auxiliary cross head 55.

Fixed to the lowermost surface of the upper stationary cross head 31 of the press by means of screws or bolts 204 is a plate 205 (FIGS. 4 and 5) provided with a plurality of bores or passageways 206 extending therethrough and adapted to conduct steam or other heating fluid. At its front and rear edges, the plate 205 is provided with a pair of horizontal flanges 207 so as to define between the cross head 31 and the flanges 207 a pair of tracks 208 which are longitudinally aligned with the tracks 198 located below the supporting member 176. Thus, the injection unit carrier member 195 can be moved, through the intermediary of the drive means 181 etc. and the block 182, from a position underlying the supporting members 176 to a position underlying the cross head 31, and vice versa. The lengths of the respective tracks 198 and 208 are, of course, sufficient to receive all the rollers 197 when the injection unit 199—201 is moved out of or into the press.

As with the lower injection unit, there is associated with the upper injection unit an anti-backrinding device constituted by an interposer plate 209 which supports on its lower surface a plate 210 carrying a plurality of sprue-pulling pins 211 identical with the pins 167—167a, the number and distribution of the pins 211 corresponding to the number and distribution of the bores in the upper auxiliary cross head 55. The plate 209 is pivotally connected at one side with the injection unit carrier member 195, as shown at 212 (FIG. 3), and is provided with upright front and rear ledges 213 which support a plurality of rollers 214 adapted to ride along the tracks 208. At its outermost side, the plate 209 is provided with a pair of transverse arms 215 to the opposite ends of which are connected cables 216 passing over respective pulleys 217 and carrying weights 218. In this manner, when the injection unit underlies the upper stationary cross head 31, the anti-backrinding device 209 is tilted upwardly and out of the way of the operator into the position shown in FIG. 1. In order to facilitate downward swinging of the plate 209 as the injection unit is withdrawn from the press, there are journaled in respective recesses 219 (FIG. 5) formed in the upper cross head 31 two rollers 220 which are in rolling contact with the uppermost edges of the front and rear ledges 213 of the interposer plate 209. In the same manner as the interposer plate 163, the plate 209 carries on its lower surface four tapered dowel pins 221 which are adapted to enter the tapered bores 110 in the web 102 of the upper auxiliary cross head 55.

Referring again to FIGS. 1 and 1a, there is positioned adjacent the side of the machine remote from the platform 111 a platform 222 supported on legs 223. The upper surfaces of this platform and of the platform 111 thus are adapted to serve as work tables for the operators of the press attending the lower and upper press openings, respectively, on which the molds 61 may be serviced before and after each injection and curing cycle.

*Operation*

The operation of the press according to the present invention will now be apparent and may be briefly summarized as follows, particular reference being had as well to FIGS. 19 to 23.

At the start, the ram 34 is fully lowered and the intermediate movable press platen 46 is in its lowermost position, as determined by the lengths of the guide rods 58, substantially at the center of the space between the ramcap 35 and the upper stationary cross head 31. Concurrently, hydraulic fluid under pressure has been admitted into the cylinders 40 via the lines 41 and into the cylinders 49 via the lines 52, whereby the lower and upper auxiliary cross heads 44 and 55 are moved to their extreme raised locations with respect to the ramcap 35 and the intermediate platen 46, respectively, and away from the associated mold-supporting units 71. Positioned on the tables 111 and 222 at this time are two book-type molds 61 which have already been folded together from the condition of FIG. 8 to the condition of FIG. 7, each mold 61 thus having a plurality of mold cavities defined therein by the respective sets of mold elements 68, 69 and 70.

As a further starting condition, the motors 126 and 188 have been operated to rotate the respective lead screws 122 and 181 so as to displace the blocks 127 and 182 away from the press, whereby the injection unit carrier members 135 and 195 are moved to their respective inoperative positions outside of the press, and the anti-backrinding or interposer plates 163 and 209 are brought to their horizontal positions inside the press. While in their inoperative positions, the cylinder members 152 and 201 are suspended from the respective carrier members below and away from the associated piston members 151 and 199 through the intermediary of the bolts 158 and 201a to permit the desired charges of molding compound to be placed into the cylinder members and onto the respective perforated bottom plates 155 and 203 thereof. It will be readily understood that the feeding of the molding compound into the injection cylinders may be effected manually or automatically with the aid of suitably controlled transfer elements, as desired. Finally, the chambers 76 of the pressure capsule type mold-supporting units 71 have been filled with a hydraulic fluid, say oil or water. As a practical matter, the filling operation is carried out by opening the bleed lines 82 and admitting the hydraulic fluid into the chambers until it can be seen coming out of the bleed lines, at which time the plugs 82a are fitted in place and the bore 80 either plugged up or connected to a variable or constant pressure hydraulic system associated with the press. The purpose of the latter arrangements will be more fully explained presently. The press is then in the condition illustrated in solid lines in FIG. 19.

The operators or press attendants stationed at the platforms or tables 111 and 222, respectively, now move the molds 61 into the press, placing the mold from the table 111 onto the upper mold-supporting unit 71 and the mold from the table 222 onto the lower mold-supporting unit 71, and taking care that each mold is accurately positioned between the guide rails 86 and against the stop member or abutment 87 of its respective supporting unit. The molds are thus located as shown in broken lines in FIG. 19, and this condition of the press corresponds to that illustrated in FIG. 1a.

The hydraulic motors 39 and 50 are now reversed, with hydraulic fluid under pressure being admitted into the cylinders 40 and 49 via the lines 42 and 51, respectively. In this manner, the auxiliary cross heads 44 and 55 are lowered toward the ramcap 35 and intermediate platen 46, respectively, and the upper and lower molds 61 positioned thereon.

At this point it is deemed essential to note that usually not all of the individual mold stacks 68—69—70 will be of the same height, due mainly to ordinary manufacturing tolerances. As previously set forth, moreover, the individual axial dimensions of the mold elements or inserts 68, 69 and 70 are deliberately made slightly greater than the thicknesses of the respective carrier plates 62, 63 and 64 (see FIG. 10, for example), whereby each mold stack 68—69—70 projects slightly above its associated top carrier plate 64 and slightly below its associated bottom carrier plate 63. Thus, the arrangement is such that the descending auxiliary cross heads, due to the positioning of the molds on level surfaces, engage the top elements 70 of the molds. If, therefore, the molds 61 were to be resting on a rigid surface, as has heretofore been the universal practice in injection molding operations, it would be entirely possible that the rigid auxiliary cross heads 44 and 55 might not exert the same clamping force on each mold stack 68—69—70, whereby the different mold lands would not be uniformly pressed together and those subjected to the lesser clamping forces might be subsequently spread apart by injected molding compound, permitting the latter to escape from the respective mold cavities so as to form flash on the molded articles.

It is for the purpose of overcoming this potentially serious drawback that the mold-supporting units 71 are constructed in the form of pressure capsules having relatively thin, flexible diaphragm-like uppermost surfaces on which the bottom elements 69 of the mold stacks rest. The different mold stacks, when contacted by the center plates of the respective auxiliary cross heads, will, consequently, be subjected to the same clamping force which will be uniform for each mold inasmuch as the diaphragms 73b will be elastically deformed under the applied loads, being bulged downwardly under the larger mold stacks and upwardly by means of the hydraulic fluid under the smaller mold stacks. In this manner, manufacturing tolerances in the various mold elements are precisely compensated for and a uniform distribution of the clamping forces is assured. This result is not affected in any way by the choice of operational conditions of the supporting units 71, i.e., by whether the hydraulic fluid is locked in the chamber 76 (FIG. 10) or is subjected to varying pressures by the press hydraulic systems (FIG. 9), pumps, etc.

As soon as the auxiliary cross heads 44 and 55 have been lowered into their operative, mold clamping positions, the motors 126 and 188 are reversed by any suitable starting means (not shown) to rotate the lead screws 122 and 181 so as to move the blocks 127 and 182 toward the press. Accordingly, the injection unit carrier members 135 and 195 are moved to their respective operative positions underlying the intermediate platen 46 and the upper stationary cross head 31, movements which are not impeded by the auxiliary cross heads since the latter were previously moved downwardly from their respective positions illustrated in FIG. 1a. Concurrently with the inward movement of the injection units, the interposer plates 163 and 209 move out of the press and are tilted upwardly under the actions of the weights 169 and 218 so as not to interfere with the actions of the operators. The press is then in the condition illustrated in FIG. 20.

The ram 34 is now actuated and moved upwardly relative to the lower stationary cross head 30 so as to move the ramcap 35, and therewith as a unit the hydraulic motors 39, the lower mold-supporting unit 71, the lower mold 61, and the lower auxiliary cross head 44, upwardly toward the lower injection cylinder member 152. The latter, when contacted by the auxiliary cross head 44, begins to move freely upwardly toward the associated piston member 151 until engaged by the presser feet 149 projecting from the injection unit carrier member 135. The upward movement of the ram is thus transferred through the cylinder member 152 and the springs 150 to the intermediate platen 46 and by the latter to the upper mold-supporting unit 71, the upper mold 61, and the upper auxiliary cross head 55. As the ram continues to move upwardly and brings the auxiliary cross head 55 against the upper injection cylinder member 201, the latter moves freely against the presser feet 200 projecting from the upper injection unit carrier member 195. Thereafter, the final stage of the ram movement causes the cylinder members 152 and 201 to be moved upwardly along their associated piston members 151 and 199, as a result of which the charges of molding compound previously placed into the cylinder cavities 153 and 202 are forced through the perforations in the cylinder bottom plates 155 and 203 into the bores or passageways 99 and 109 in the respective auxiliary cross heads 44 and 55, and thence into the mold cavities 68a through the sprues 70b of the various mold stacks.

In connection with the foregoing, it is to be noted that when the press is being closed under high pressure and the loading capsule chambers 76 are connected to the pressure systems or lines of the press, the hydraulic fluid in these chambers is also under high pressure, as a result of which the clamping force applied to the mold stacks corresponds to the full ram or line pressure.

While the injection operation is taking place, the plug pins 167 and 211 of the anti-backrinding devices 163 and 209 may be cleaned, as by brushes 224, of cured sprues 225 of molding compound adhering to the pins from a preceding molding operation (if such was carried out). The press is now in the condition illustrated in FIGS. 1 and 21. It will be understood that during this stage of the molding cycle, the upward movement of the injection unit carrier member 135 is not hindered in any way due to the sliding connection between the arms 133 thereof and the connecting pins 131 carried by the arms 129—130 affixed to the traversing block 127.

As soon as the injection operation has been completed, the ram 34 is lowered to its starting position, as a result of which the intermediate platen 46 is also lowered to its starting position. The hydraulic motors 39 and 50 are, however, not deactuated or reversed. This ensures that the various mold stacks are continually clamped together to prevent any formation of flash between the mold lands. It will be understood that when the loading capsule chambers 76 are connected to the press lines, the pressure in each chamber drops considerably during the lowering of the ram, say to about 300 p.s.i., which is sufficient to continue the required mold clamping action due to the fact that, with the injection operation terminated, there is less internal pressure in the mold cavities tending to produce a separation of the mold plates and the formation of flash. The two sets of hydraulic motors 39 and 50 must, therefore, have respective total capacities (for pulling the auxiliary cross heads 44 and 55 downwardly) at least equal to the upward loads exerted on the molds 61 by the capsules 71 during the time the press is open for removal of the injection units. When the capsule chambers 76 are closed off, however, the total capacities of the sets of hydraulic motors 39 and 50 must be sufficient to supply the entire needed clamping forces for the interval of time during which the press is open pending removal of the injection units.

As the ram is lowered, the center plates 96 and 106 of the auxiliary cross heads 44 and 55 separate readily from the injection cylinders 152 and 201 and no blanket of molding compound remains on the said center plates since any excess quantity of the molding compound employed in the injection cylinders remains in the latter due to the presence of the perforated bottom plates 155 and 203. When the auxiliary cross heads are completely separated from the injection cylinders and the intermediate platen has reached its lowermost position, the motors 126 and 188 are again actuated to withdraw the injection units from the press and to draw the interposer or anti-backrinding plates 163 and 209 into the press. The press is then in the condition illustrated in FIG. 22.

The ram 34 is now again raised to bring the lower auxiliary cross head 44 against the interposer plate 163 supported at the underside of the intermediate platen 46. The tapered dowel pins 168 project from the plate 163 slightly beyond the plane of the heads 167a of the sprue-plugging pins 167 (see FIGS. 1 and 1a, for example) and thus enter the guide bores 100 in the horizontal flange 93 of the lower auxiliary cross head 44 first, to thereby ensure accurate alignment of the plug pins 167 with the bores 99 in the auxiliary cross head center plate 96. When the pins 167 are fully received within the bores 99, as indicated in FIG. 11, the movement of the ram is transmitted via the interposer plate 163 to the intermediate platen 46, whereby the latter is moved upwardly until the tapered dowel pins 221 are received in the guide bores 110 of the upper auxiliary cross head 55 and the sprue-pulling pins 211 in the bores 109 of the center plate 106 of the upper auxiliary cross head 55. The press is now in the condition illustrated in FIG. 23. It is to be noted that the interposer plates 163 and 209 serve to fill some of the space previously occupied by the injection units and thus reduce the amount of ram travel needed to reclose the press.

During this part of the production cycle, the molding compound injected into the various mold cavities 68a is cured by virtue of the heat generated by the steam or other heating fluid flowing through the conduits 83 in the bottom members 72 of the two mold-supporting units 71, through the conduits 138 in the plate 137 affixed to the underside of the intermediate platen 46, and through the conduits 206 in the plate 205 affixed to the underside of the upper stationary cross head 31. Thus, the capsules 71 not only function as mold-supporting units and pressure distributing and equalizing means, but also as steam or heating platens for the curing stage of the cycle. The anti-backrinding plates 166 and 210 totally prevent any escape of molding compound through the auxiliary cross head bores 99 and 109 (see FIG. 11) and at the same time serve to transmit some of the curing heat to the molds from the heating platens 137 and 205. Upon completion of the curing operation, the ram 34 is again lowered and the hydraulic motors 39 and 50 are reversed to raise the respective auxiliary cross heads 44 and 55. The press is thus again in the condition illustrated in FIG. 19. Due to the fact that the headed sprue-pulling pins 167 and 211 carried by the interposer plates 163 and 209 are embedded in the cured molding compound sprues 225, separation of the auxiliary cross heads from the anti-backrinding plates will cause these sprues to rupture at the junctures thereof with the cured molded articles 226 (FIG. 11) and to be drawn out of the bores 99 and 109 while still adhering to the pins 167 and 211 from which they are subsequently removed by the brushes 224 (FIG. 21). The filled molds 61 can now be removed onto the tables 111 and 222 by the respective operators, emptied, cleaned and serviced, and returned into the press for the next injection operation as previously described.

It is to be understood, of course, that although the machine according to the present invention has been described as being one in which there are provided two operating spaces defined, respectively, between the intermediate platen and the upper and lower stationary cross heads, the principles of the present invention are equally applicable to a single-opening press, i.e., one in which only one operating space is provided. In such a case, the intermediate platen, the upper mold-supporting unit 71 and the upper auxiliary cross head 55 and its appurtenant elements are dispensed with while at the same time the lower injection unit and its associated transfer mechanism are eliminated. In the operation of such a press, the ram 34 would move the auxiliary cross head 44 directly against the cylinder member of the single injection unit the carrier member of which rides along the tracks 198 provided at the underside of the upper cross head 31. Moreover, the machine according to the invention is so constructed that it is possible to employ the same in conjunction with two-plate or two-element molds rather than with the three plate or three-element molds 61 shown. For this purpose, the center or adapter plates 96 and 106 of the auxiliary cross heads 44 and 55 will be so constructed that the bores 99 and 109 thereof constitute the actual sprue passageways or mold top plates for the respective molds.

By way of résumé, therefore, it will be seen that there has been provided in accordance with the present invention an injection molding machine in which at least one multi-plate, multi-cavity mold can be positioned with its bottom plates on a flexible, hydraulic fluid-backed diaphragm and clamped there-against by an auxiliary cross head for substantially the entire molding cycle, i.e., from a time preceding the initiation of the injection operation to a time subsequent to the termination of the curing operation. The mold-clamping auxiliary cross head, the clamping force of which is uniformly distributed over the entire area of the mold by the flexible diaphragm and the incompressible hydraulic fluid on which the latter rests so as to ensure a uniform clamping of all the mold lands, is provided with passageways establishing access to the various mold sprues or mold cavities, these passageways being adapted to conduct molding compound forced through a correspondingly perforated bottom plate of an injection cylinder constituting a part of an injection unit which can be moved into the machine for the injection operation and moved out of the machine for the curing operation. The injection unit is further associated with an interposer plate which is moved out of the machine when the injection unit moves in and is moved into the machine when the injection unit moves out, the interposer plate being constructed to block the aforesaid passageways in the auxiliary cross head so as to prevent escape of molding compound therethrough during the curing operation.

It will be understood that the machine according to the present invention is susceptible to a number of changes and variations none of which involves any departure from the spirit or scope of the present invention, and it is contemplated that all such changes and variations be embraced by the appended claims.

Having thus described my invention, what I claim and desire to protect by Letters Patent is:

1. An injection molding machine, comprising first and second spaced main crossheads rigidly interconnected with one another and defining therebetween a working space, ram means arranged in said first main crosshead for reciprocal movement toward and away from said second main crosshead, pressure distributing means carried by said ram means and providing a mold-supporting bottom contact surface for a multi-plate mold, an auxiliary crosshead positioned between said pressure distributing means and said second main crosshead, said auxiliary crosshead being connected with said ram means so as to be displaceable toward and away from said pressure distributing means, said auxiliary crosshead extending across said pressure distributing means and being adapted when moved toward the latter to clamp said mold thereagainst, said pressure distributing means ensuring a uniform distribution of the clamping force over the cavity area of said mold, that portion of said auxiliary crosshead which contacts said mold being provided with a plurality of passageways adapted to communicate with the sprues of said mold, and an injection unit adapted to be moved into and out of said working space so as to be located, when moved thereinto, in a position between said auxiliary crosshead and said second main crosshead, said injection unit being adapted to inject molding compound through said passageways in said auxiliary crosshead and into said sprues of said mold.

2. An injection molding machine as described in claim 1, in which said pressure distributing means comprises an hydraulic pressure capsule provided with an hydraulic fluid-containing chamber and a flexible diaphragm covering said chamber and defining the supporting surface for said multi-plate mold.

3. An injection molding machine as described in claim 1, in which said pressure distributing means comprises a resilient pad.

4. An injection molding machine as described in claim 3, in which said resilient pad is an elastomer pad.

5. An injection molding machine as described in claim 1, in which said pressure distributing means comprises a hydraulic ram.

6. An injection molding machine as described in claim 1, in which said injection unit comprises a piston member and a cylinder member, the latter having an open bottom covered by a flexible perforated plate on which molding compound to be injected into said mold may be placed, the perforations in said flexible plate corresponding in number and distribution to said passageways in said auxiliary crosshead.

7. An injection molding machine as described in claim 1, further comprising a heating platen carried by said second main crosshead at the underside thereof, said heating platen defining a track on which said injection unit is supported when moved into said working space.

8. An injection molding machine as described in claim 1, further comprising anti-backrinding means positioned above said auxiliary crosshead and adapted to be placed in contact therewith and to cover the passageways therein after said injection unit is moved out of said working space.

9. An injection molding machine as described in claim 8, in which said anti-backrinding means comprises a plate pivotally connected at one side to said injection unit, said plate carrying a plurality of pins corresponding in number and distribution to said passageways in said auxiliary crosshead and adapted to enter said passageways during curing of the injected molding compound.

10. An injection molding machine as described in claim 1, in which said auxiliary crosshead comprises a pair of spaced rigid side members, a rigid horizontal web attached to said side members and extending across the space therebetween, and a pair of spaced vertical members attached to said side members and said horizontal web and extending across the space between said side members, whereby there is defined between said side members and said vertical members a cavity for receiving said pressure distributiong means and said mold, said horizontal web having a plurality of apertures therein corresponding in number and distribution to the sprues of said mold.

11. An injection molding machine as described in claim 10, in which said horizontal web is provided with a large central opening, said auxiliary crosshead further comprising a plate seated in said opening and connected to said horizontal web, said apertures being located in said plate, whereby said plate may be interchanged to adapt said auxiliary crosshead for use with differently constructed molds.

12. An injection molding machine as described in claim 1, a multi-cavity mold comprising a plurality of plates, at least one of said plates being provided with a plurality of openings therein, a plurality of inserts received within said openings, said inserts each comprising a mold cavity therein, said inserts each being independently movable normal and with respect to said receiving plate.

13. In an injection molding machine as described in claim 1, a mold having a plurality of plates, the bottom surface of the bottom plate being plane, said plates having axially aligned cavity forming walls, the cavities defined thereby having the shape of the articles to be molded, the cavities in the uppermost plate comprising sprues to receive the molding compound, and an interposer plate positioned between said uppermost plate and said auxiliary crosshead and having a plurality of apertures therein equal in number and distribution to said cavities, said apertures in said interposer plate forming a continuation of said sprues but having a reduced diameter thereby to form a neck at each sprue, said neck providing mechanical anchorage in the molding compound cured in each of said sprues.

14. Apparatus as described in claim 13, in which said bottom plate is relatively thin, said apparatus further comprising a plurality of inserts attached to said bottom plate of said mold, said inserts corresponding in number and distribution to the cavities in said mold, said inserts defining the lower surfaces of said mold cavities, the bottom surfaces of said inserts being substantially flush with the upper surface of said bottom plate.

15. Apparatus as described in claim 13, in which said bottom plate of said mold comprises a plurality of recesses formed on the upper side thereof to form weakened sections therein, said recesses surrounding said mold cavities, whereby said bottom mold plate is flexible and easily deformable at said weakened sections.

16. A mold device comprising: a cover platen; a base platen cooperating with said cover platen in defining a mold cavity and having weakened sections corresponding with all points which are to be cut off to eliminate flash; and pressure distributing means for selectively applying pressure to the weakened sections of said base platen whereby said base platen will flex under said pressure to cut off said mold cavity along the parting lines.

17. Apparatus for molding flashless articles comprising: a cover piece; a base piece cooperating with said cover piece in defining a mold cavity, said base piece including weakened sections arranged adjacent to said mold cavity; and pressure distributing means engageable with said base piece for selectively opposing said weakened sections, so constructed and arranged that the base piece will flex about said weakened sections under the clamping pressure applied to said cover piece and said base piece, thereby cutting off said mold cavity along the parting lines so as to eliminate flash on said molded articles.

18. Apparatus for molding flashless articles comprising: a cover piece including a sprue, a runner and a gate; a base piece cooperating with said cover piece in defining a mold cavity, said base piece including weakened sections arranged adjacent to said mold cavity; and pressure distributing means including a resilient pad driven by a plunger for selectively applying pressure to said weakened sections, so constructed and arranged that the base piece will flex about said weakened sections under the clamping pressure applied to said cover piece and said base piece, thereby cutting off said mold cavity along the parting lines so as to eliminate flash on said molded articles.

19. Apparatus for molding flashless articles comprising: a cover piece including a sprue, a runner and a gate; a base piece cooperating with said cover piece in defining a mold cavity, said base piece including weakened sections arranged adjacent to said mold cavity; and pressure distributing means including a hydraulic ram for selectively applying pressure to said weakened sections, so constructed and arranged that the base piece will flex about said weakened sections under the clamping pressure applied to said cover piece and said base piece, thereby cutting off said mold cavity along the parting lines so as to eliminate flash on said molded articles.

20. Apparatus for molding flashless articles comprising: a cover piece including a sprue, a runner and a gate; a base piece cooperating with said cover piece in defining a mold cavity, said base piece including weakened sections arranged adjacent to said mold cavity; pressure distributing means including an elastomer pad engageable with said base piece for selectively applying pressure to said weakened sections, so constructed and arranged that the base piece will flex about said weakened sections under the pressure applied thereto by said pressure distributing means, thereby cutting off said mold cavity along the parting lines so as to eliminate flash on said molded articles.

21. Apparatus for molding flashless articles comprising: a cover piece including a sprue, a runner and a gate; a base piece cooperating with said cover piece in defining a mold cavity, said base piece including sections weakened by channels formed around the lands and arranged adjacent to and spaced apart from said mold cavity; and pressure distributing means engageable with said base piece for selectively applying pressure to said weakened sections, so constructed and arranged that the base piece will flex about said weakened sections under the clamping pressure applied thereto by said pressure distributing means, thereby cutting off said mold cavity along the parting lines so as to eliminate flash on said molded articles.

22. Apparatus for molding flashless articles comprising: a cover piece including a sprue, a runner, and a gate; a base piece cooperating with said cover piece in defining a mold cavity, said base piece including weakened sections arranged adjacent to and spaced apart from said mold cavity; an intermediate piece interposable between said cover piece and said base piece for further defining said mold cavity, said intermediate piece including weakened sections aligned with the weakened sections of said base piece; and pressure distributing means engageable with said base piece for selectively applying pressure to said weakened sections, so constructed and arranged that the base piece and the intermediate piece will flex about said weakened sections under the clamping pressure applied thereto by said pressure distributing means, thereby cutting off said mold cavity along the parting lines so as to eliminate flash on said molded articles.

23. Apparatus for molding trimless articles comprising: a cover piece; a base piece cooperatnig with said cover piece in defining a mold cavity, said base piece including weakened sections arranged adjacent to said mold cavity; and pressure distributing means engageable with said base piece for selectively opposing the weakened sections thereof, so constructed and arranged that the base piece will flex about said weakened sections under the clamping pressure applied to said cover piece and said base piece, thereby cutting off said mold cavity along the parting lines so as to minimize flash on said molded article.

References Cited in the file of this patent
UNITED STATES PATENTS

| | | |
|---|---|---|
| 170,925 | Wetmore | Dec. 14, 1875 |
| 923,585 | Schacht | June 1, 1909 |
| 1,466,730 | Sanfard | Sept. 4, 1923 |
| 2,005,260 | Hayett | June 18, 1935 |
| 2,072,349 | Wayne | Mar. 2, 1937 |
| 2,302,094 | Bacon | Nov. 17, 1942 |
| 2,389,169 | Stacy | Nov. 20, 1945 |
| 2,431,943 | Land et al. | Dec. 2, 1947 |
| 2,444,339 | Dinzl | June 29, 1948 |
| 2,452,382 | Long | Oct. 26, 1948 |
| 2,841,822 | Clough et al. | July 8, 1958 |
| 2,883,704 | Jurgeleit | Apr. 28, 1959 |
| 2,948,926 | Kuhn | Aug. 16, 1960 |